(12) United States Patent
Xu et al.

(10) Patent No.: US 11,695,360 B2
(45) Date of Patent: Jul. 4, 2023

(54) METHOD AND APPARATUS FOR ESTIMATING ROTOR POSITION OF MOTOR, AND MOTOR CONTROL SYSTEM

(71) Applicants: Guangdong Midea White Home Appliance Technology Innovation Center Co., Ltd., Foshan (CN); Midea Group Co., Ltd., Foshan (CN)

(72) Inventors: Peilin Xu, Foshan (CN); Yi Liu, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 57 days.

(21) Appl. No.: 17/443,443

(22) Filed: Jul. 26, 2021

(65) Prior Publication Data
US 2021/0359630 A1    Nov. 18, 2021

Related U.S. Application Data

(63) Continuation of application No. PCT/CN2019/124314, filed on Dec. 10, 2019.

(30) Foreign Application Priority Data

Jan. 30, 2019    (CN) .......................... 201910091013.7

(51) Int. Cl.
*H02P 21/18*    (2016.01)
*H02P 21/13*    (2006.01)

(52) U.S. Cl.
CPC .............. *H02P 21/18* (2016.02); *H02P 21/13* (2013.01)

(58) Field of Classification Search
CPC .................................. H02P 21/18; H02P 21/13
See application file for complete search history.

(56) References Cited

U.S. PATENT DOCUMENTS 8,169,172 B2    5/2012   Markunas et al.
10,601,354 B2 *  3/2020   Mao .................. H02P 21/06
(Continued)

FOREIGN PATENT DOCUMENTS

CN    103269198 A    8/2013
CN    103986395 A    8/2014
(Continued)

OTHER PUBLICATIONS

Younggi Lee et al., Compensation of Position Estimation Error for Precise Position-Sensorless Control of IPMSM Based on High-Frequency Pulsating Voltage Injection, 2017, 6 pgs.
(Continued)

*Primary Examiner* — Said Bouziane
(74) *Attorney, Agent, or Firm* — Morgan, Lewis & Bockius LLP

(57) ABSTRACT

A method and apparatus for estimating a rotor position of a motor, and a motor control system. The method includes: obtaining a position error signal by injecting a high-frequency signal into a stator winding of the motor; obtaining a load parameter indicating a load of the motor, obtaining a direct-current component disturbance value according to the load parameter and a first preset relationship, obtaining a harmonic component disturbance value according to the load parameter and a second preset relationship, and obtaining an observer parameter value according to the load parameter and a third preset relationship; compensating the position error signal according to the direct-current component disturbance value and the harmonic component disturbance value to obtain a compensated position error signal; adjusting an observer parameter according to the observer
(Continued)

parameter value, and adjusting the compensated position error signal through an adjusted observer to obtain the rotor position and a rotor speed.

20 Claims, 8 Drawing Sheets

(56) References Cited

U.S. PATENT DOCUMENTS

| | | | |
|---|---|---|---|
| 2014/0327379 A1 | 11/2014 | Yang et al. | |
| 2015/0100264 A1 | 4/2015 | Qian et al. | |

FOREIGN PATENT DOCUMENTS

| | | | |
|---|---|---|---|
| CN | 107171610 A | 9/2017 | |
| CN | 107959446 A | 4/2018 | |
| CN | 108322121 A | 7/2018 | |
| CN | 108336937 A | 7/2018 | |

OTHER PUBLICATIONS

WuChun, Research on Sensorless Control Technology of PMSM speed control system, Nov. 2015, 264 pgs.

Liu et al., Investigation of Rotor Saliency-Tracking Based Sensorless Vector Control Drive for PMSM, Chinese Soc. for Electric Eng., vol. 25, No. 17, 2005, 18 pgs.

Wang Limei, Speed estimation and compensation for harmonics in sensorless wound rotor synchronous machines, 2005, 8 pgs.

Alexander Rambetius et al., Sensorless control of permanent magnet synchronous motor based on high frequency signal injection, 2005, 203.

International search report, International Application No. PCT/CN2019/124314, dated Feb. 27, 2020 (13 pages).

European search report, European Application No. 19913165.7, dated Jan. 31, 2022, 8 pgs.

* cited by examiner

METHOD AND APPARATUS FOR ESTIMATING ROTOR POSITION OF MOTOR, AND MOTOR CONTROL SYSTEM

CROSS REFERENCE

The present application is a continuation application of PCT International Application No. PCT/CN2019/124314, filed on Dec. 10, 2019, which claims the benefit of Chinese Patent Application No. CN 201910091013.7, filed on Jan. 30, 2019, filed with the China National Intellectual Property Administration, and entitled "Method and Apparatus for Estimating Rotor Position of Electric Motor, And Electric Motor Control System," the entire contents of which are hereby incorporated by reference in their entirety.

TECHNICAL FIELD

The present disclosure relates to the field of motor control technologies, and in particular to a method and an apparatus for estimating a rotor position of a motor, and a motor control system.

BACKGROUND

Motors such as permanent magnet synchronous motors have many advantages such as high efficiency, small size and light weight, and are therefore widely used in various industrial fields. To ensure an efficient and stable operation of the permanent magnet synchronous motors, accurate rotor position information is essential. A motor low-speed position detection method based on high-frequency injection is to obtain a high-frequency current response signal by injecting a high-frequency signal into a stator winding and to perform signal processing to obtain estimated rotor position information. However, due to the influence of the cogging structure, winding distribution and core saturation, etc. of the motor, especially when the motor is heavily loaded, a main salient pole effect of the motor will be distorted and the motor will derive a non-ideal multiple-salient-poles effect, resulting in large position estimation errors, which in turn affects the reliable operation of the motor.

To mitigate the influence of the non-ideal salient pole effect, a method has been proposed in the related art to improve the rotor position estimation performance by analyzing a motor salient pole model, reconstructing a current disturbance signal caused by multiple salient poles, and then compensating the disturbance signal at an input of a position observer. However, the problem is that the above method is only applicable to cases where the main salient pole effect and the multiple-salient-poles effect do not change significantly with the load, and cannot solve the accuracy and stability problems caused by the significant changes in the amplitude and phase of the motor salient pole effects with the load.

SUMMARY OF THE DISCLOSURE

A first aspect of the present disclosure provides a method for estimating a rotor position of a motor, comprising: obtaining a position error signal by injecting a high-frequency signal into a stator winding of the motor; obtaining a load parameter indicating a load of the motor, obtaining a direct-current component disturbance value according to the load parameter and a first preset relationship, obtaining a harmonic component disturbance value according to the load parameter and a second preset relationship, and obtaining an observer parameter value according to the load parameter and a third preset relationship; compensating the position error signal or an associated signal of the position error signal according to the direct-current component disturbance value and the harmonic component disturbance value to obtain a compensated position error signal; and adjusting an observer parameter according to the observer parameter value, and adjusting the compensated position error signal through an adjusted observer to obtain the rotor position and a rotor speed.

In some embodiments, the compensating the position error signal or the associated signal of the position error signal according to the direct-current component disturbance value and the harmonic component disturbance value includes: obtaining a total disturbance value by superimposing the direct-current component disturbance value with the harmonic component disturbance value; and obtaining the compensated position error signal by inverting the total disturbance value and superimposing the inverted total disturbance value on the position error signal or on the associated signal of the position error signal.

In some embodiments, in accordance with a determination that the high-frequency signal is a 45-degree axis demodulated pulse signal, a pulsating signal, or a square wave signal, the injecting the high-frequency signal into the stator winding of the motor includes: injecting the high-frequency signal into an estimated d-axis of an estimated dq coordinate system; in accordance with a determination that the high-frequency signal is a rotating high-frequency signal, the injecting the high-frequency signal into the stator winding of the motor includes: injecting a first high-frequency signal into an α-axis of a stationary coordinate system and a second high-frequency into a β-axis of the stationary coordinate system.

In some embodiments, the load parameter is a q-axis average current in an estimated rotor coordinate system.

In some embodiments, an offline test is performed to obtain the first preset relationship, the second preset relationship, and the third preset relationship; the first preset relationship is configured to indicate a mapping relationship between the load parameter and the direct-current component disturbance value; the second preset relationship is configured to indicate a mapping relationship between the load parameter and the harmonic component disturbance value; the third preset relationship is configured to indicate a mapping relationship between the load parameter and an amplitude of a main salient pole signal of the motor; the amplitude of the main salient pole signal is inversely proportional to the observer parameter value.

In some embodiments, in accordance with a determination that the high-frequency signal is a 45-degree axis demodulated pulse signal, a pulsating signal, or a square wave signal, obtaining the first preset relationship includes: obtaining an actual d-axis through a position sensor; obtaining a high-frequency current response test signal by injecting the high-frequency signal into the actual d-axis; and obtaining the direct-current component disturbance value corresponding to each preset load by determining a direct-current disturbance component in the high-frequency current response test signal and measuring a disturbance value of the direct-current disturbance component under each preset load.

In some embodiments, in accordance with a determination that the high-frequency signal is a 45-degree axis demodulated pulse signal, a pulsating signal, or a square wave signal, obtaining the second preset relationship includes: obtaining an actual d-axis through a position sensor; obtaining a high-frequency current response test signal by injecting the high-frequency signal into the actual d-axis; and obtaining the harmonic component disturbance value corresponding to each preset load by determining a harmonic disturbance component in the high-frequency current response test signal and measuring an amplitude and a phase of each harmonic component of the harmonic disturbance component under each preset load.

In some embodiments, in accordance with a determination that the high-frequency signal is a 45-degree axis demodulated pulse signal, a pulsating signal, or a square wave signal, and the harmonic component disturbance value is a 6th harmonic component disturbance value, obtaining the second preset relationship includes: obtaining an actual d-axis through a position sensor; obtaining a high-frequency current response test signal by injecting the high-frequency signal into the actual d-axis; and obtaining the harmonic component disturbance value corresponding to each preset load by determining a harmonic disturbance component in the high-frequency current response test signal and measuring an amplitude and a phase of a 6th harmonic disturbance component under each preset load.

In some embodiments, in accordance with a determination that the high-frequency signal is a 45-degree axis demodulated pulse signal, a pulsating signal, or a square wave signal, and the harmonic component disturbance value is a 6th harmonic component disturbance value, obtaining the third preset relationship includes: through the position sensor, keeping an estimated d-axis stationary in an estimated dq coordinate system; and driving, by an actual d-axis of an actual dq coordinate system, the motor to rotate synchronously to obtain a high-frequency current response test signal; and obtaining the amplitude of the main salient pole signal corresponding to each preset load by filtering the high-frequency current response test signal or performing Fourier decomposition on the high-frequency current response test signal.

In some embodiments, in accordance with a determination that the high-frequency signal is a rotating high-frequency signal, obtaining the third preset relationship includes: in a stationary coordinate system, obtaining a high-frequency current in the stationary coordinate system by injecting the rotating high-frequency signal into a stator winding of the motor; obtaining rotor position information at low frequency by processing the high-frequency current in the stationary coordinate system, wherein the rotor position information at low frequency includes an α-axis low-frequency current and αβ-axis low-frequency current; and obtaining the amplitude of the main salient pole signal corresponding to each load by measuring the amplitudes of the main salient pole signal of the α-axis low-frequency current or the β-axis low-frequency current under different loads.

In some embodiments, in accordance with a determination that the high-frequency signal is a rotating high-frequency signal, obtaining the first preset relationship includes: obtaining an actual rotor position of the motor through a position sensor, and obtaining a high-frequency current response test signal according to the actual rotor position; and obtaining the direct-current component disturbance value corresponding to each preset load by determining a direct-current disturbance component in the high-frequency current response test signal and measuring a disturbance value of the direct-current disturbance component under each preset load.

In some embodiments, in accordance with a determination that the high-frequency signal is a rotating high-frequency signal, obtaining the second preset relationship includes: obtaining an actual rotor position of the motor through a position sensor, and obtaining a high-frequency current response test signal according to the actual rotor position; and obtaining the harmonic component disturbance value corresponding to each preset load by determining a harmonic disturbance component in the high-frequency current response test signal and measuring an amplitude and a phase of each harmonic component of the harmonic disturbance component under each preset load.

In some embodiments, in accordance with a determination that the high-frequency signal is a rotating high-frequency signal, and the harmonic component disturbance value is a 6th harmonic component disturbance value, obtaining the second preset relationship includes: obtaining an actual rotor position of the motor through a position sensor, and obtaining a high-frequency current response test signal according to the actual rotor position; and obtaining the harmonic component disturbance value corresponding to each preset load by determining a harmonic disturbance component in the high-frequency current response test signal and measuring an amplitude and a phase of a 6th harmonic disturbance component under each preset load.

In some embodiments, in accordance with a determination that the high-frequency signal is a 45-degree axis demodulated pulse signal, obtaining the position error signal includes: collecting a current of a stator winding, and obtaining a d-axis current and a q-axis current in a 45-degree estimated dq coordinate system by performing a coordinate transformation on the current of the stator winding; obtaining a first deviation current by calculating a difference between the d-axis current and the q-axis current in the 45-degree estimated dq coordinate system, and obtaining a filtered first deviation current by band-pass filtering the first deviation current; and obtaining a first current response signal by multiplying the filtered first deviation current with a first preset signal, and obtaining a second current response signal by low-pass filtering the first current response signal; wherein the first preset signal is determined according to the high-frequency signal, and the second current response signal is a direct-current portion of the first current response signal; wherein the first current response signal is the associated signal of the position error signal, and the second current response signal is the position error signal.

In some embodiments, in accordance with a determination that the high-frequency signal is a pulsating signal, obtaining the position error signal includes: obtaining a total estimated q-axis current, and obtaining a filtered estimated q-axis current by band-pass filtering the total estimated q-axis current; and obtaining a third current response signal by multiplying the filtered estimated q-axis current with a second preset signal, and obtaining a fourth current response signal by low-pass filtering the third current response signal; wherein the second preset signal is determined according to the high-frequency signal, and the fourth current response signal is a direct-current portion of the third current response signal; the third current response signal is the associated signal of the position error signal, and the fourth current response signal is the position error signal.

In some embodiments, in accordance with a determination that the high-frequency signal is a square wave signal, obtaining the position error signal includes: collecting a total estimated q-axis current, and obtaining an estimated q-axis filter current at a current sampling moment by band-pass filtering the total estimated q-axis current; obtaining an estimated q-axis filter current at a previous sampling moment, and calculating a difference between the estimated q-axis filter current at the current sampling moment and the estimated q-axis filter current at the previous sampling moment to obtain a second deviation current; and obtaining the position error signal by multiplying the second deviation current with a third preset signal.

In some embodiments, in accordance with a determination that the high-frequency signal is a rotating high-frequency signal, obtaining the position error signal includes: obtaining a high-frequency current in a stationary coordinate system, and obtaining rotor position information at low frequency by separating and extracting positive and negative sequence signals from the high-frequency current in the stationary coordinate system, wherein the rotor position information at low frequency includes an α-axis low-frequency current and a β-axis low-frequency current; and obtaining the position error signal by heterodyne processing the α-axis low-frequency current and the β-axis low-frequency current.

A second aspect of the present disclosure provides an apparatus for estimating a rotor position of a motor, comprising a memory, a processor, and a program for estimating the rotor position of the motor stored in the memory and runnable on the processor; wherein when the processor executes the program, the described method for estimating the rotor position of the motor is realized.

A third aspect of the present disclosure provides a motor control system, comprising an apparatus for estimating a rotor position of a motor described in the second aspect.

BRIEF DESCRIPTION OF THE DRAWINGS

The above and/or additional aspects and advantages of the present disclosure will become obvious and easy to understand from the following description of the embodiments in conjunction with the accompanying drawings.

DETAILED DESCRIPTION

Figure 1:
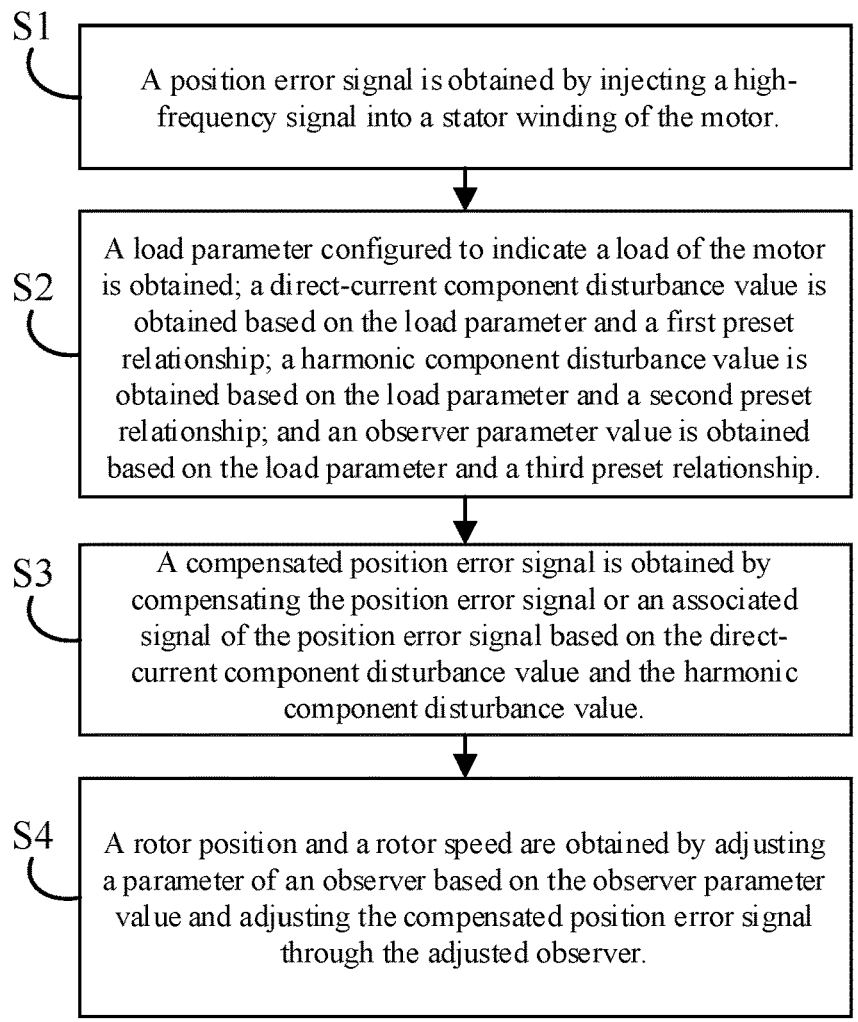
FIG. 1 is a flowchart of a method for estimating a rotor position of a motor according to some embodiments of the present disclosure.

The embodiments of the present disclosure are described in detail below. Examples of the embodiments are shown in the accompanying drawings, wherein same or similar reference numerals indicate same or similar elements or elements with same or similar functions. The embodiments described below with reference to the accompanying drawings are exemplary and intended to explain the present disclosure, but should not be understood as a limitation to the present disclosure.

Before describing a method and an apparatus for estimating a rotor position of a motor, and a motor control system in embodiments of the present disclosure with reference to the accompanying drawings, a method for estimating a rotor position of a motor in the related art will be introduced first.

Motors such as permanent magnet synchronous motors have many advantages such as high efficiency, small size and light weight, and are therefore widely used in various industrial fields. To ensure an efficient and stable operation of the permanent magnet synchronous motors, accurate rotor position information is essential. Conventionally, the rotor position information can be obtained through a position sensor, which also increases the size and cost of the motor. Therefore, a position-sensorless technology based on a rotor position estimation of motor counter potential and a rotor position estimation based on a motor salient pole effect has been widely researched and discussed. The rotor position estimation method based on the motor salient pole effect may be applied to the position observation of the motor at zero speed and low speed, including methods such as high frequency injection, discrete pulse and pulse width modulation (PWM) vector injection.

The low-speed motor position detection method based on high-frequency injection is to inject a high-frequency carrier signal into a stator winding of the motor, extract a current response signal related to a salient pole position, and obtain estimated rotor position information through a position observer. However, due to the influence of the cogging structure, winding distribution and core saturation, etc. of the motor, especially when the motor is heavily loaded, a main salient pole effect of the motor will be distorted and the motor will derive a non-ideal multiple-salient-poles effect. Specifically, the injected high-frequency signal not only interacts with the main salient pole of the motor to produce a useful high-frequency current signal, but also produces disturbing high-frequency current signals with other non-ideal multiple salient poles. The disturbing high-frequency current signals will obviously affect the accuracy and stability of the position detection algorithm, resulting in large position estimation errors, which in turn affects the reliable operation of the motor.

In the related art, the rotor position estimation performance is improved by analyzing a motor salient pole model, reconstructing a current disturbance signal caused by multiple salient poles, and then compensating the disturbance signal at an input of a position observer. However, the problem is that the above method is only applicable to cases where the main salient pole effect and the multiple-salient-poles effect do not change significantly with the load, and cannot solve the accuracy and stability problems caused by the significant changes in the amplitude and phase of the motor salient pole effects with the load.

In view of the above problems, the present disclosure proposes a method and an apparatus for estimating a rotor position of a motor, and a motor control system. A three-part comprehensive compensation strategy of a direct-current disturbance component, a harmonic disturbance component and an online adjustment of an observer parameter gain is applied to solve the accuracy and stability problems when the amplitude and phase of the motor salient pole effect change significantly with the load.

FIG. 1 is a flowchart of a method for estimating a rotor position of a motor according to some embodiments of the present disclosure. The method for estimating the rotor position of the motor includes operations at blocks illustrated in FIG. 1.

At block S1: A position error signal is obtained by injecting a high-frequency signal into a stator winding of the motor.

It should be noted that the high-frequency signal may refer to a signal with a frequency range of 500 Hz to 5 kHz.

At block S2: A load parameter configured to indicate a load of the motor is obtained; a direct-current component disturbance value is obtained based on the load parameter and a first preset relationship; a harmonic component disturbance value is obtained based on the load parameter and a second preset relationship; and an observer parameter value is obtained based on the load parameter and a third preset relationship.

In some embodiments, the load parameter may be an estimate of an average current $\hat{i}_{qf}$ in a q-axis in a rotor coordinate system. The load parameter may represent the magnitude of the load.

Further, in some embodiments, the first preset relationship, the second preset relationship, and the third preset relationship are obtained through offline test. The first preset relationship is configured to indicate a mapping relationship between the load parameter and the direct-current component disturbance value. The second preset relationship is configured to indicate a mapping relationship between the load parameter and the harmonic component disturbance value. The third preset relationship is configured to indicate a mapping relationship between the load parameter and an amplitude of the main salient pole signal of the motor. The amplitude of the main salient pole signal is inversely proportional to the observer parameter value.

It can be understood that according to the first preset relationship, the second preset relationship, and the third preset relationship obtained by the offline test, in the process of estimating the position of the motor rotor, the direct-current component disturbance value, the harmonic component disturbance value and the amplitude of the main salient pole signal that change with the load may be obtained in real time by looking up the table. In this way, direct-current component disturbance compensation, harmonic component disturbance compensation and position observer parameter gain adjustment may be performed online in real time to ensure more accurate rotor position information.

At block S3: A compensated position error signal is obtained by compensating the position error signal or an associated signal of the position error signal based on the direct-current component disturbance value and the harmonic component disturbance value.

It should be understood that the associated signal of the position error signal refers to being associated with the position error signal. For example, the associated signal may be a signal that can be processed to obtain the position error signal. In this way, by compensating the associated signal of the position error signal, and then processing the compensated associated signal, the compensated position error signal is obtained.

Figure 2:
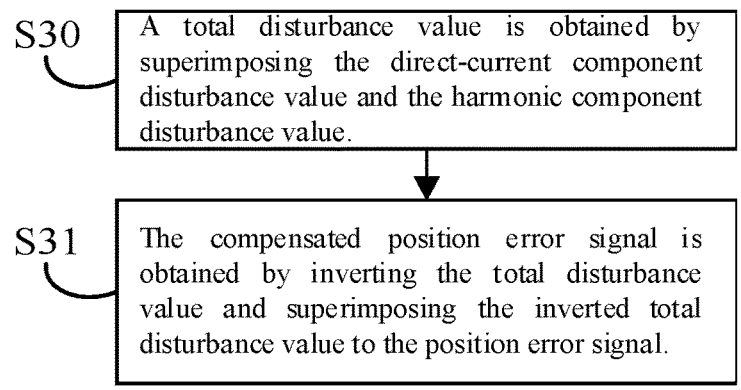
FIG. 2 is a flowchart of the operation S3 in the method for estimating the rotor position of the motor shown in FIG. 1.

In some embodiments, as shown in FIG. 2, the obtaining the compensated position error signal by compensating the position error signal or the associated signal of the position error signal based on the direct-current component disturbance value and the harmonic component disturbance value may further includes the following operations S30-S31.

At block S30: A total disturbance value $\hat{i}_{com}$ is obtained by superimposing the direct-current component disturbance value and the harmonic component disturbance value.

At block S31: The compensated position error signal is obtained by inverting the total disturbance value $\hat{i}_{com}$ and superimposing the inverted total disturbance value $\hat{i}_{com}$ to the position error signal or the associated signal of the position error signal.

At block S4: A rotor position and a rotor speed are obtained by adjusting a parameter of an observer based on the observer parameter value and adjusting the compensated position error signal through the adjusted observer.

As an example, as shown in FIGS. 3b and 4-16, the observer can be a proportional integral (PI) controller or an integral controller.

In some embodiments, the high-frequency signal may be a 45-degree axis demodulated pulse signal, or a pulse signal, or a square wave signal, or a rotating high-frequency signal. It should be noted that when the pulse signal is injected, the high-frequency response signal on the estimated coordinate system is transformed into a 45-degree estimated coordinate system for processing, and the rotor position information may be extracted more effectively. This method is called a 45-degree axis demodulation. To distinguish the pulse injection signal from other position demodulation methods, the injected pulse signal herein is called a 45-degree axis demodulated pulse signal.

In the following, the rotor position estimation method of the present disclosure will be described in detail from the four aspects of the 45-degree axis demodulated pulse signal, the pulse signal, the square wave signal, and the rotating high-frequency signal.

Embodiment 1: Taking the 45-degree axis demodulated pulse signal as an example, the method for estimating the rotor position of the motor in the embodiments of the present disclosure will be described in detail.

Specifically, in some embodiments, in cases that the high-frequency signal is a 45-degree axis demodulated pulse signal, the injecting the high-frequency signal into the stator winding of the motor may include: injecting the high-frequency signal into an estimated d-axis of an estimated dq coordinate system. For example, the high-frequency signal may be a high-frequency voltage signal.

The injected high-frequency voltage may be expressed as a formula followed.

$$\begin{cases} \hat{U}_d = U\cos\omega_h t \\ \hat{U}_q = 0 \end{cases} \quad (1)$$

In formula (1), U is the amplitude of the injected high-frequency voltage, $\omega_h$ is the high-frequency injection frequency, and $\hat{u}_d$ and $\hat{u}_q$ are estimated d and q axis voltages in the dq coordinate system, respectively.

Figure 3A:
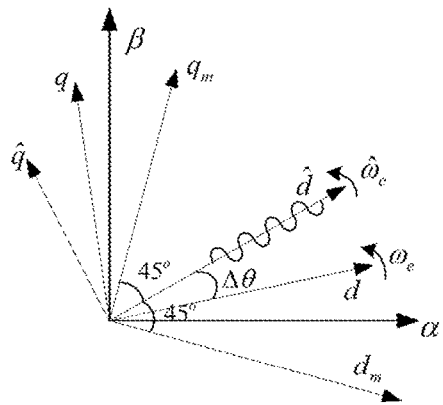
FIG. 3a is a schematic view of 45-degree coordinate transformation in which a high-frequency signal is a 45-degree axis demodulated pulse signal in a method for estimating a rotor position of a motor according to some embodiments of the present disclosure.
Figure 3B:
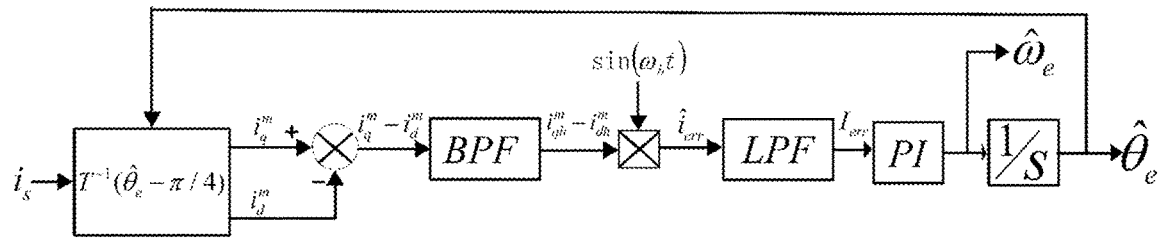
FIG. 3b is a schematic block view in which a high-frequency signal is a 45-degree axis demodulated pulse signal in a method for estimating a rotor position of a motor according to some embodiments of the present disclosure.

Further, in some embodiments, as shown in FIG. 3b, in cases that the high-frequency signal is a 45-degree axis demodulated pulse signal, the obtaining the position error signal includes: collecting a current $i_s$ of the stator winding, and obtaining a d-axis current $i_d^m$ and a q-axis current $i_q^m$ in a 45-degree estimated dq coordinate system by performing a coordinate transformation of the stator winding current $i_s$; obtaining a first deviation current $i_q^m - i_d^m$ by calculating a difference between the d-axis current $i_d^m$ and the q-axis current $i_q^m$ in the 45-degree estimated dq coordinate system, and obtaining a filtered first deviation current $i_{qh}^m - i_{dh}^m$ by band-pass filtering the first deviation current $i_q^m - i_d^m$; obtaining a first current response signal $\hat{i}_{err}$ by multiplying the filtered first deviation current $i_{qh}^m - i_{dh}^m$ with a first preset signal, and obtaining a second current response signal $I_{err}$ by low-pass filtering the first current response signal $\hat{i}_{err}$. The first preset signal is determined according to the high-frequency signal. For example, the first preset signal may be $\sin(\omega_h t)$, and the second current response signal $I_{err}$ is a direct-current portion of the first current response signal $\hat{i}_{err}$. The first current response signal $\hat{i}_{err}$ is the associated signal of the position error signal, and the second current response signal $I_{err}$ is the position error signal.

It can be understood that, a mathematical model of the estimated dq coordinate system of the motor may be a formula followed.

$$\begin{bmatrix} \hat{i}_{dh} \\ \hat{i}_{qh} \end{bmatrix} = \frac{1}{Z_{dh}Z_{qh}} \begin{bmatrix} Z - \Delta Z\cos(2\Delta\theta) & -\Delta Z\sin(2\Delta\theta) \\ -\Delta Z\sin(2\Delta\theta) & Z + \Delta Z\cos(2\Delta\theta) \end{bmatrix} \begin{bmatrix} \hat{U}_d \\ \hat{U}_q \end{bmatrix} \quad (2)$$

In formula (2), $\hat{i}_{dh}$ and $\hat{i}_{qh}$ represent the high-frequency current signals of the d-axis and q-axis in the estimated dq coordinate system, respectively. $\Delta\theta$ is a position error, that is, an error between an actual rotor position $\theta_e$ and an estimated rotor position $\hat{\theta}_e$. Z and $\Delta Z$ satisfy relationships as followed.

$$Z = \frac{Z_{dh} + Z_{qh}}{2} = \frac{j\omega_h L_{dh} + j\omega_h L_{qh}}{2} \quad (3)$$

$$\Delta Z = \frac{Z_{dh} - Z_{qh}}{2} = \frac{j\omega_h L_{dh} - j\omega_h L_{qh}}{2}$$

In formula (3), $Z_{dh}$ and $Z_{qh}$ represent high-frequency impedance of the d-axis and q-axis in the dq coordinate system, respectively. $L_{dh}$ and $L_{qh}$ represent high-frequency incremental inductances of the d-axis and q-axis in the dq coordinate system, respectively. The d-axis and q-axis high-frequency current response signals in the estimated dq coordinate system can be obtained by bringing formula (1) into formula (2) as followed.

$$\hat{i}_{dh} = \frac{(L_{qh} + L_{dh}) + \cos(2\Delta\theta)(L_{qh} - L_{dh})}{2\omega_h L_{dh} L_{qh}} U\sin\omega_h t \quad (4)$$

$$\hat{i}_{qh} = \frac{\sin(2\Delta\theta)(L_{qh} - L_{dh})}{2\omega_h L_{dh} L_{qh}} U\sin\omega_h t$$

To more stably extract the rotor position information from the high-frequency current response signal, as shown in FIG. 3a, the d-axis and q-axis respectively represent the coordinate axis in an actual dq coordinate system, the $\hat{d}$ axis and $\hat{q}$ axis respectively represent the coordinate axis in the estimated dq coordinate system, $\alpha$ axis and $\beta$ axis respectively represent the coordinate axis in a stationary coordinate system, $d_m$ axis and $q_m$ axis respectively represent the coordinate axis in the 45 degree estimated dq coordinate system, $\hat{\omega}_e$ represents an estimated rotor speed, and $\omega_e$ represents an actual rotor speed. The $d_m$ axis and $q_m$ axis in the 45-degree estimated dq coordinate system differ respectfully from the $\hat{d}$ axis and $\hat{q}$ axis of the estimated dq coordinate system by 45 degrees in electrical angle. The high-frequency current signals $\hat{i}_{dh}$ and $\hat{i}_{qh}$ of the d-axis and q-axis in the estimated dq coordinate system are transformed to the 45-degree estimated dq coordinate system by 45-degree coordinate transformation to obtain the high-frequency current signals $\hat{i}_{dh}^m$ and $\hat{i}_{qh}^m$ of the $\hat{d}$ axis and $\hat{q}$ axis in the 45-degree estimated dq coordinate system.

$$\begin{bmatrix} i_{dh}^m \\ i_{qh}^m \end{bmatrix} = \frac{U}{2\sqrt{2}\,\omega_h L_{dh} L_{qh}} \quad (5)$$

$$\sin(\omega_h t) \begin{bmatrix} L_{qh} + L_{dh} + (L_{qh} - L_{dh})(\cos(2\Delta\theta) - \sin(2\Delta\theta)) \\ L_{qh} + L_{dh} + (L_{qh} - L_{dh})(\cos(2\Delta\theta) + \sin(2\Delta\theta)) \end{bmatrix}$$

It can be seen from formula (5) that when the high-frequency current deviation $i_{qh}^m - i_{dh}^m$ on the $d_m$ axis and $q_m$ axis in the 45-degree estimated dq coordinate system is zero (when $(L_{qh} - L_{dh})$ is not equal to zero, that is, the saliency of the motor exists), the position error $\Delta\theta$ is zero. Therefore, for the motor with salient pole effect, the high-frequency current deviation $i_{qh}^m - i_{dh}^m$ can be directly controlled, that is, the high-frequency current deviation $i_{qh}^m - i_{dh}^m$ can be controlled to zero in real time, such that the estimated rotor position $\hat{\theta}_e$ can track the actual rotor position $\theta_e$ in real time, that is, the position error $\Delta\theta$ is zero.

Specifically, to achieve the above-mentioned control of the high-frequency current deviation $i_{qh}^m - i_{dh}^m$, as shown in FIGS. 3b and 4-6, the current $i_s$ of the stator winding is first coordination transformed to obtain the current $i_d^m$ in the $d_m$ axis and the current $i_q^m$ in $q_m$ axis the in the 45-degree dq estimated coordinate system. The difference between the current $i_d^m$ in the $d_m$ axis and the current $i_q^m$ in $q_m$ axis the in the 45-degree dq estimated coordinate system is calculated to obtain the first deviation current $i_q^m - i_d^m$. The first deviation current $i_q^m - i_d^m$ is filtered through a band-pass filter (BPF) to obtain the filtered first deviation current $i_{qh}^m - i_{dh}^m$. The function of the BPF is to filter out an inverter switching signal and a low-frequency fundamental signal in the current response signal to obtain a high frequency current response signal with a high signal-to-noise ratio. The filtered first deviation current $i_{qh}^m - i_{dh}^m$ is thus obtained as followed.

$$i_{qh}^m - i_{dh}^m = U \frac{(L_{qh} - L_{dh})}{\sqrt{2}\,\omega_h L_{dh} L_{qh}} \sin(2\Delta\theta)\sin(\omega_h t) \quad (6)$$

The filtered first deviation current $i_{qh}^m - i_{dh}^m$ is multiplied by the first preset signal $\sin(\omega_h t)$ to obtain the first current response signal $\hat{i}_{err}$ as followed.

$$\hat{i}_{err} = (i_{qh}^m - i_{dh}^m) \cdot \sin\omega_h t = \frac{\sin(2\Delta\theta)(-L_{dh} + L_{qh})}{\sqrt{2}\,\omega_h L_{dh} L_{qh}} U \left( \frac{1 - \cos(2\omega_h t)}{2} \right) \quad (7)$$

It can be seen from formula (7) that the first current response signal $\hat{i}_{err}$ includes two components, namely a direct-current component and a two times carrier frequency component. To obtain the direct-current component, a low-pass filter (LPF) may be configured to filter out the two times carrier frequency component to obtain the second current response signal $I_{err}$ as followed.

$$I_{err} = LPF(\hat{i}_{err} \cdot \sin\omega_h t) = \frac{U(-L_{dh} + L_{qh})}{2\sqrt{2}\,\omega_h L_{dh} L_{qh}} \sin(2\Delta\theta) \quad (8)$$

Further, the formula (8) may be expressed as the following form.

$$I_{err} = LPF(\hat{i}_{err} \cdot \sin\omega_h t) = I_m \sin(2\Delta\theta) \quad (9)$$

In formula (9), $I_m$ is the amplitude of the second current response signal.

Furthermore, as shown in FIGS. 3b and 4-6, the second current response signal $I_{err}$ may be input as the position error signal into the observer to obtain the estimated rotor position $\hat{\theta}_e$ and the estimated rotor speed $\omega_e$.

However, when the motor is loaded, the motor saliency effect changes significantly due to non-linear factors such as iron core saturation, resulting in the actual second current response signal in formula (9) as followed.

$$I_{err} = I_m^* \sin(2\Delta\theta + \theta_m) + \sum_n I_{n\text{-}th}^* \sin(\pm n\theta_e - 2\hat{\theta}_e + \varphi_{n\text{-}th}) \quad (10)$$

The formula (10) may be further transformed as followed.

$$I_{err} \approx I_m^* \sin(2\Delta\theta) + I_{dc}^* \sin(\theta_m) + \sum_n I_{n\text{-}th}^* \sin(\pm n\theta_e - 2\hat{\theta}_e + \varphi_{n\text{-}th}) \quad (11)$$

In formula (11), n is a harmonic order of multiple salient poles, $I_{n\text{-}th}^*$ and $\varphi_{n\text{-}th}$ are the amplitude and phase of the high-frequency current generated by a n-th salient pole harmonic, respectively, $I_m^*$ represents the amplitude of a main harmonic signal, $I_{dc}^*$ represents the amplitude of the disturbance signal of the direct-current component. ±depends on the rotation direction of the multiple salient harmonics, and $\theta_m$ represents the phase shift of the main salient signal. It can be found from formula (11) that, affected by the non-ideal motor salient pole effect (including the main salient pole and the multiple salient poles), the second current response signal $I_{err}$ obtained from actual processing has changed significantly compared to formula (9), which can be summarized in three aspects as follows.

a) The amplitude of the main harmonic signal $I_m^*$ changes with the load.

b) The direct-current component disturbance signal $I_{dc}^* \sin(\theta_m)$. The appearance of this part of the disturbance component is the result of the phase shift of the main salient signal, and changes with the load.

c) The disturbance signal generated by the n-th salient pole harmonic, that is, the third term $(\sum_n I_{n\text{-}th}^* \sin(\pm n\theta_e - 2\hat{\theta}_e + \varphi_{n\text{-}th}))$ in formula (11), is caused by the multiple salient poles, and the amplitude and phase change with the load.

Figure 4:
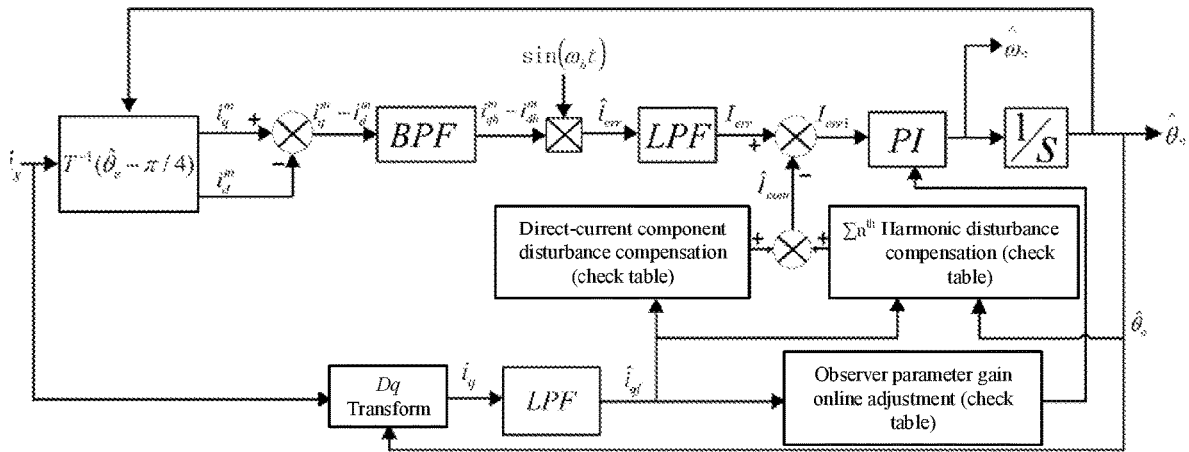
FIG. 4 is a schematic block view of error compensation in a case that a high-frequency signal is a 45-degree axis demodulated pulse signal in a method for estimating a rotor position of a motor according to some embodiments of the present disclosure.
Figure 5:
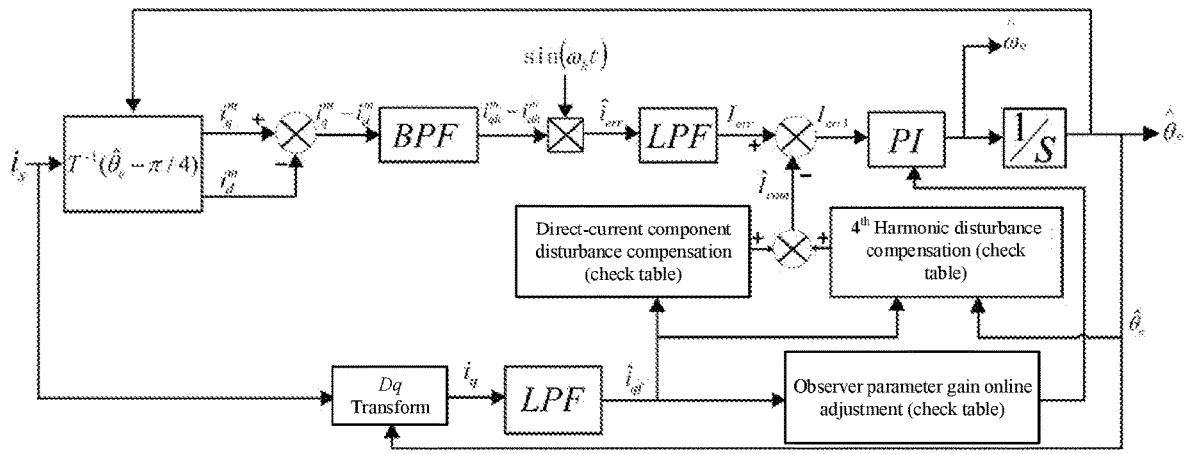
FIG. 5 is a schematic block view of error compensation in a case that a high-frequency signal is a 45-degree axis demodulated pulse signal in a method for estimating a rotor position of a motor according to some embodiments of the present disclosure.
Figure 6:
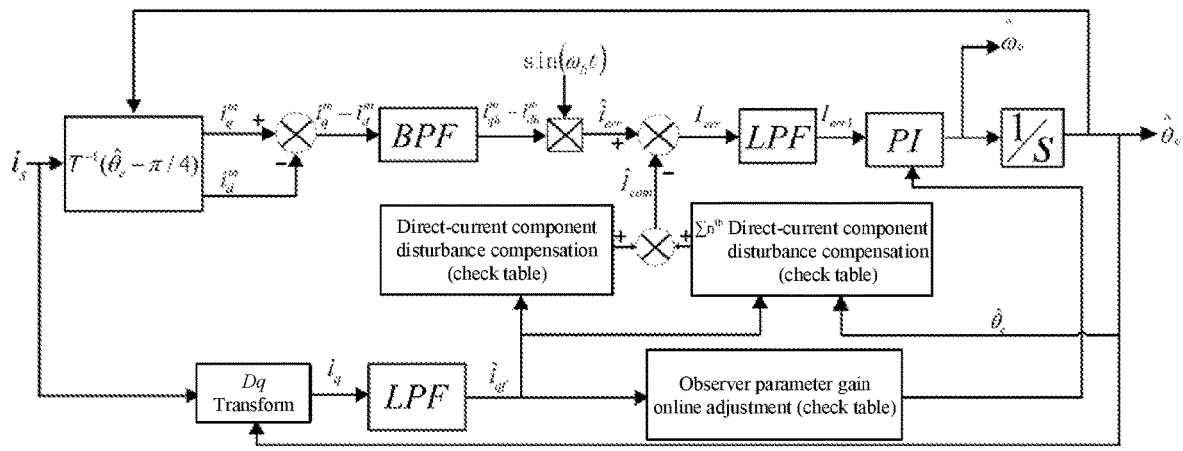
FIG. 6 is a schematic block view of error compensation in a case that a high-frequency signal is a 45-degree axis demodulated pulse signal in a method for estimating a rotor position of a motor according to further embodiments of the present disclosure.
Figure 7:
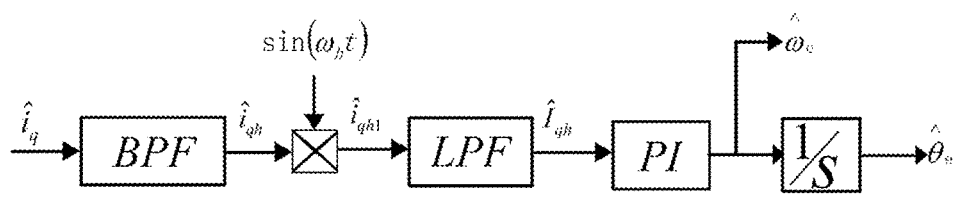
FIG. 7 is a schematic block view in which a high-frequency signal is a pulse signal in a method for estimating a rotor position of a motor according to some embodiments of the present disclosure.

Therefore, the method for estimating the rotor position of the motor in the embodiment of the present disclosure comprehensively considers the influence of the above non-ideal factors, and proposes a global position estimation error compensation method. To ensure the stability of position estimation, as shown in FIGS. 4-6, a comprehensive compensation strategy of the present disclosure is proposed as followed.

a) The direct-current component disturbance compensation. Specifically, based on a direct-current component disturbance value and a load parameter (that is, a q-axis average current $\hat{i}_{qf}$ in the estimated rotor coordinate system) that are offline measured, the direct-current component disturbance value that changes with the load during the rotor position estimation process is obtained in real time. The q-axis average current $\hat{i}_{qf}$ in the estimated rotor coordinate system is obtained by coordinate transforming the current $i_s$ of the stator winding on the stator coordinate system to the estimated dq coordinate system, and then filtering through the low-pass filter.

b) The nth harmonic component disturbance compensation. Specifically, based on a disturbance amplitude, a phase and a load parameter (that is, a q-axis average current $\hat{i}_{qf}$ in the estimated rotor coordinate system) generated by all nth harmonics measured offline, the harmonic component disturbance value that changes with the load during the rotor position estimation process is obtained in real time. It can be seen from FIGS. 4-6 that the direct-current component disturbance value and the harmonic component disturbance value are superimposed to obtain the total disturbance value $\hat{I}_{com}$. The total disturbance value $\hat{I}_{com}$ is inverted and superimposed on the position error signal $\hat{I}_{err}$ to obtain a compensated position error signal $I_{err1}$ which is then input to the observer.

c) The online adjustment of the observer parameter gain. Specifically, based on the offline measured amplitude of the main salient pole signal that changes with the load, the parameter value of the observer is adjusted in real time online to ensure stable operation of the observer. The compensated position error signal $I_{err1}$ is adjusted through the adjusted observer to obtain the estimated rotor position $\hat{\theta}_e$ and the estimated rotor speed $\hat{\omega}_e$.

The three parts of the comprehensive compensation strategy in the embodiments of the present disclosure work together to ensure the convergence and stability of position observation, improving the application ability of the high-frequency injection position-sensorless algorithm under low-frequency heavy load.

In some embodiments, the first preset relationship indicating the mapping relationship between the load parameter and the direct-current component disturbance value, the second preset relationship indicating the mapping relationship between the load parameter and the harmonic component disturbance value, and the third preset relationship indicating the mapping relationship between the load parameter and the amplitude of the main salient pole signal of the motor are obtained through offline test. The specific offline test method may be divided into the following two operations. The position sensor may be applied for auxiliary test to obtain offline data.

Operation 1: Offline Test of the First Preset Relationship and the Second Preset Relationship.

Specifically, in some embodiments, when the high-frequency signal is a 45-degree axis demodulated pulse signal, the obtaining the first preset relationship includes: obtaining an actual d-axis through the position sensor; obtaining a high-frequency current response test signal by injecting a high-frequency signal into the actual d-axis; determining a direct-current disturbance component in the high-frequency current response test signal, and measuring a disturbance value of the direct-current disturbance component under each preset load to obtain a direct-current component disturbance value corresponding to each preset load.

Further, in some embodiments, when the high-frequency signal is a 45-degree axis demodulated pulse signal, the obtaining the second preset relationship includes: obtaining an actual d-axis through the position sensor; obtaining a high-frequency current response test signal by injecting a high-frequency signal into the actual d-axis; determining a harmonic disturbance component in the high-frequency current response test signal, and measuring an amplitude and a phase of each harmonic component of the harmonic disturbance component under each preset load to obtain a harmonic component disturbance value corresponding to each preset load.

It can be understood that the actual d-axis position of the motor is obtained through the position sensor, and then the high-frequency voltage signal is injected through the actual d-axis of the motor. The actual rotor position $\theta_e$ herein and the estimated rotor position $\hat{\theta}_e$ coincide, that is, $\Delta\theta=0$. Therefore, according to formula (11), the high-frequency current response test signal herein can be obtained as followed.

$$I'_{err} = I^*_{dc}\sin(\theta_m) + \sum_n I^*_{n-th}\sin((\pm n - 2)\theta_e + \varphi_{n-th}) \quad (12)$$

In formula (12), the first part is the direct-current disturbance component, and the second part is the harmonic disturbance component. Therefore, by measuring the direct-current component value and the amplitude and the phase of each harmonic component of the high-frequency current response test signal $I_{err}'$ under each load at this time (that is, the q-axis average current $\hat{i}_{qf}$ in the estimated rotor coordinate system), the disturbance value of the direct-current component and the harmonic component can be obtained respectively, thus obtaining the direct-current component disturbance value and harmonic component disturbance value corresponding to each preset load. The first preset relationship and the second preset relationship are then constructed based on the obtained data. Furthermore, as shown in FIGS. 4-6, during the motor rotor position estimation process, real-time online compensation is performed according to the first preset relationship and the second preset relationship.

In other embodiments, when the high-frequency signal is a 45-degree axis demodulated pulse signal, and the harmonic component disturbance value is a 6th harmonic component disturbance value, the obtaining the second preset relationship further includes: obtaining an actual d-axis through the position sensor; obtaining a high-frequency current response test signal by injecting a high-frequency signal into the actual d-axis; determining a harmonic disturbance component in the high-frequency current response test signal, and measuring an amplitude and a phase of a 6th harmonic disturbance component under each preset load to obtain a harmonic component disturbance value corresponding to each preset load.

It can be understood that due to the symmetrical distribution of the three-phase winding, the current harmonics generated by the multiple salient poles in the actual dq coordinate system are generally 6 times or integer multiples of 6, while the amplitudes of other harmonics are generally small, and the influence of the 6th harmonic is generally the largest, that is, the largest source of harmonic disturbance, herein n=4. According to formula (12), when n=4, the high-frequency current response test signal can be simplified as followed.

$$I'_{err} \approx I^*_{dc}\sin(\theta_m) + \sum_n I^*_{n-th}\sin(-4\theta_e - 2\theta_e + \varphi_{n-th}) \approx \quad (13)$$
$$I^*_{dc}\sin(\theta_m) + \sum_n I^*_{n-th}\sin(-6\theta_e + \varphi_{n-th})$$

Therefore, when the actual compensation scheme is implemented, the amplitude and phase of the 6th disturbance harmonic in the current signal can be directly measured, which can be directly used for compensation, thereby simplifying the offline measurement process.

Specifically, as shown in FIG. 5, the total disturbance value $\hat{I}_{com}$ in FIG. 4 is modified into two parts consisting of a direct current disturbance and a disturbance component of a n=4th harmonic, and then real-time online compensation is performed at the input of the observer.

Operation 2: Offline Test of the Third Preset Relationship.

In some embodiments, when the high-frequency signal is a 45-degree axis demodulated pulse signal, the obtaining the third preset relationship includes: through the position sensor, keeping the estimated d-axis stationary in the estimated dq coordinate system and driving, by the actual d-axis of the actual dq coordinate system, the motor to rotate synchronously to obtain a high-frequency current response test signal; and filtering the high-frequency current response test signal or performing Fourier decomposition on the high-frequency current response test signal to obtain an amplitude of the main salient pole signal corresponding to each preset load.

It can be understood that, through the position sensor, the estimated d-axis of the estimated dq coordinate system is kept stationary (which can be fixed on the α-axis, i.e. $\hat{\theta}_e$=0), and the actual d-axis of the actual dq coordinate system drives the motor to rotate synchronously, that is, $\Delta\theta=\theta_e$. In this way, the high-frequency current response test signal is obtained as followed.

$$I''_{err} = I_n^* \sin(2\theta_e + \theta_m) + \sum_n I_{n-th}^* \sin(\pm n\theta_e + \varphi_{n-th}) \quad (14)$$

For multiple salient signals, n≥4, therefore the two components in the high-frequency current response test signal $I_{err}''$ in formula (14) are decoupled in the frequency domain. Therefore, the high-frequency current response test signal $I_{err}''$ may be filtered or performed with Fourier decomposition to obtain the amplitude of the main salient pole signal $I_m^*$ corresponding to each preset load, that is, data of the main salient pole signal amplitude $I_m^*$ changing with the load. The third preset relationship is then constructed based on the obtained data. Furthermore, as shown in FIGS. 4-6, during the motor rotor position estimation process, the parameters of the observer are adjusted online in real time according to the third preset relationship to ensure the convergence and stability of the observer.

As shown in FIGS. 3-6, after the position error is comprehensively compensated, the observer such as a PI controller or an integral controller is applied to observe the position and speed of the rotor. Then the position and speed are brought into the system for speed and current closed-loop control, thereby realizing the position sensorless control of the motor at low speed.

As an example, in the embodiments of the present disclosure, as shown in FIG. 6, the disturbance component may also be compensated in the previous stage of the LPF. Compared with the embodiments shown in FIG. 4, the only difference is that the disturbance component is compensated from the previous stage of the LPF. That is, the total disturbance value $\hat{I}_{com}$ obtained by superimposing the total disturbance value and the harmonic component disturbance value is inverted and superimposed on the associated signal $\hat{i}_{err}$ of the position error signal to obtain the position error signal $I_{err}$. The position error signal $I_{err}$ is filtered through the LPF to obtain the compensated position error signal $I_{err1}$ which is then input into the observer.

Embodiment 2: Taking the pulsating signal as an example, the method for estimating the rotor position of the motor in the embodiments of the present disclosure will be described in detail.

Specifically, in some embodiments, in cases that the high-frequency signal is a pulsating signal, the injecting the high-frequency signal into the stator winding of the motor may include: injecting the high-frequency signal into an estimated d-axis of an estimated dq coordinate system. For example, the high-frequency signal may be a high-frequency voltage signal.

The injected high-frequency voltage may be expressed as a formula followed.

$$\begin{cases} \hat{U}_d = U\cos\omega_h t \\ \hat{U}_q = 0 \end{cases} \quad (15)$$

In formula (15), U is the amplitude of the injected high-frequency voltage, $\omega_h$ is the high-frequency injection frequency, and $\hat{u}_d$ and $\hat{u}_q$ are estimated d and q axis voltages in the dq coordinate system, respectively.

Further, in some embodiments, as shown in FIGS. 7-10, in cases that the high-frequency signal is a pulsating signal, the obtaining the position error signal includes: obtaining a total estimated q-axis current $\hat{i}_q$, and obtaining a filtered estimated q-axis current $\hat{i}_{qh}$ by band-pass filtering the total estimated q-axis current $\hat{i}_q$; obtaining a third current response signal $\hat{i}_{qh1}$ by multiplying the filtered estimated q-axis current $\hat{i}_{qh}$ with a second preset signal, and obtaining a fourth current response signal $\hat{I}_{qh}$ by low-pass filtering the third current response signal $\hat{i}_{qh1}$. The second preset signal is determined according to the high-frequency signal. For example, the second preset signal may be $\sin(\omega_h t)$, and the fourth current response signal $\hat{I}_{qh}$ is a direct-current portion of the third current response signal $\hat{i}_{qh1}$. The third current response signal $\hat{i}_{qh1}$ is the associated signal of the position error signal, and the fourth current response signal $\hat{I}_{qh}$ is the position error signal.

It should be noted that the total estimated q-axis current $\hat{i}_q$ is the estimated high-frequency current response of the q-axis in the estimated dq coordinate system.

It can be understood that, a mathematical model of the estimated dq coordinate system of the motor may be a formula followed.

$$\begin{bmatrix} \hat{i}_{dh} \\ \hat{i}_{qh} \end{bmatrix} = \frac{1}{Z_{dh}Z_{qh}} \begin{bmatrix} Z - \Delta Z\cos(2\Delta\theta) & -\Delta Z\sin(2\Delta\theta) \\ -\Delta Z\sin(2\Delta\theta) & Z + \Delta Z\cos(2\Delta\theta) \end{bmatrix} \begin{bmatrix} \hat{U}_d \\ \hat{U}_q \end{bmatrix} \quad (16)$$

In formula (16), $\hat{i}_{dh}$ and $\hat{i}_{qh}$ represent the high-frequency current signals of the d-axis and q-axis in the estimated dq coordinate system, respectively. $\Delta\theta$ is a position error, that is, an error between an actual rotor position $\theta_e$ and an estimated rotor position $\hat{\theta}_e$. Z and $\Delta Z$ satisfy relationships as followed.

$$Z = \frac{Z_{dh} + Z_{qh}}{2} = \frac{j\omega_h L_{dh} + j\omega_h L_{qh}}{2} \quad (17)$$

$$\Delta Z = \frac{Z_{dh} - Z_{qh}}{2} = \frac{j\omega_h L_{dh} - j\omega_h L_{qh}}{2}$$

In formula (17), $Z_{dh}$ and $Z_{qh}$ represent high-frequency impedance of the d-axis and q-axis in the dq coordinate system, respectively. $L_{dh}$ and $L_{qh}$ represent high-frequency incremental inductances of the d-axis and q-axis in the dq coordinate system, respectively. The high-frequency current response signal (that is, the filtered estimated q-axis current $\hat{i}_{qh}$) in the estimated dq coordinate system can be obtained by bringing formula (15) into formula (16) as followed.

$$\hat{i}_{qh} = \frac{\sin(2\Delta\theta)(L_{qh} - L_{dh})}{2\omega_h L_{dh} L_{qh}} U \sin\omega_h t \qquad (18)$$

It can be seen from formula (18) that for a motor with a salient pole effect, that is, $(L_{dh}-L_{qh})$ is not equal to zero, when the position error $\Delta\theta$ is zero, the filtered estimated q-axis current $\hat{i}_{qh}$ is also zero. Therefore, the filtered estimated q-axis current $\hat{i}_{qh}$ can be directly controlled, that is, the filtered estimated q-axis current $\hat{i}_{qh}$ can be controlled to zero in real time, such that the estimated rotor position $\hat{\theta}_e$ can track the actual rotor position $\theta_e$ in real time, that is, the position error $\Delta\theta$ is zero. To achieve the above control of the filtered estimated q-axis current $\hat{i}_{qh}$ as shown in FIGS. 7-10, the filtered estimated q-axis current $\hat{i}_{qh}$ is multiplied with the second preset signal $\sin(\omega_h t)$ to obtain the third current response signal $\hat{i}_{qh1}$.

$$\hat{i}_{qh1} = \hat{i}_{qh} \cdot \sin\omega_h t = \frac{\sin(2\Delta\theta)(L_{qh} - L_{dh})}{2\omega_h L_{dh} L_{qh}} U \left(\frac{1 - \cos(2\omega_h t)}{2}\right) \qquad (19)$$

It can be seen from formula (19) that the third current response signal $\hat{i}_{qh1}$ includes two components, namely a direct-current component and a two times carrier frequency component. To obtain the direct-current component, a LPF may be configured to filter out the two times carrier frequency component to obtain the fourth current response signal $\hat{i}_{qh}$ as followed.

$$\hat{i}_{qh} = LPF(\hat{i}_{qh} \cdot \sin\omega_h t) = \frac{U(-L_{dh} + L_{qh})}{4\omega_h L_{dh} L_{qh}} \sin(2\Delta\theta) \qquad (20)$$

Further, the formula (20) may be expressed as the following form.

$$\hat{i}_{qh} = LPF(\hat{i}_{qh} \cdot \sin\omega_h t) = I_m \sin(2\Delta\theta) \qquad (21)$$

In formula (21), $I_m$ is the amplitude of the fourth current response signal.

Furthermore, as shown in FIGS. 7-10, the fourth current response signal $\hat{i}_{qh}$ may be input as the position error signal into the observer to obtain the estimated rotor position $\hat{\theta}_e$ and the estimated rotor speed $\hat{\omega}_e$.

However, when the motor is loaded, the motor saliency effect changes significantly due to non-linear factors such as iron core saturation, resulting in the actual current response signal in formula (21) as followed.

$$\hat{i}_{qh} = I_m^* \sin(2\Delta\theta + \theta_m) + \sum_n I_{n-th}^* \sin(\pm n\theta_e - 2\hat{\theta}_e + \varphi_{n-th}) \qquad (22)$$

The formula (22) may be further transformed as followed.

$$\hat{i}_{qh} \approx I_m^* \sin(2\Delta\theta) + I_{dc}^* \sin(\theta_m) + \sum_n I_{n-th}^* \sin(\pm n\theta_e - 2\hat{\theta}_e + \varphi_{n-th}) \qquad (23)$$

In formula (23), n is a harmonic order of multiple salient poles, $I^*_{n-th}$ and $\varphi_{n-th}$ are the amplitude and phase of the high-frequency current generated by a n-th salient pole harmonic, respectively, $I^*_m$ represents the amplitude of a main harmonic signal, $I^*_{dc}$ represents the amplitude of the disturbance signal of the direct-current component. ±depends on the rotation direction of the multiple salient harmonics, and $\theta_m$ represents the phase shift of the main salient signal. It can be found from formula (23) that, affected by the non-ideal motor salient pole effect (including the main salient pole and the multiple salient poles), the current response signal obtained from actual processing has changed significantly compared to formula (21), which can be summarized in three aspects as follows.

a) The amplitude of the main harmonic signal $I^*_m$ changes with the load.

b) The direct-current component disturbance signal $I^*_{dc} \sin(\theta_m)$. The appearance of this part of the disturbance component is the result of the phase shift of the main salient signal, and changes with the load.

c) The disturbance signal generated by the n-th salient pole harmonic, that is, the third term $(\Sigma_n I^*_{n-th} \sin(\pm n\theta_e - 2\hat{\theta}_e + \varphi_{n-th})$ in formula (23), is caused by the multiple salient poles, and the amplitude and phase change with the load.

Figure 8:
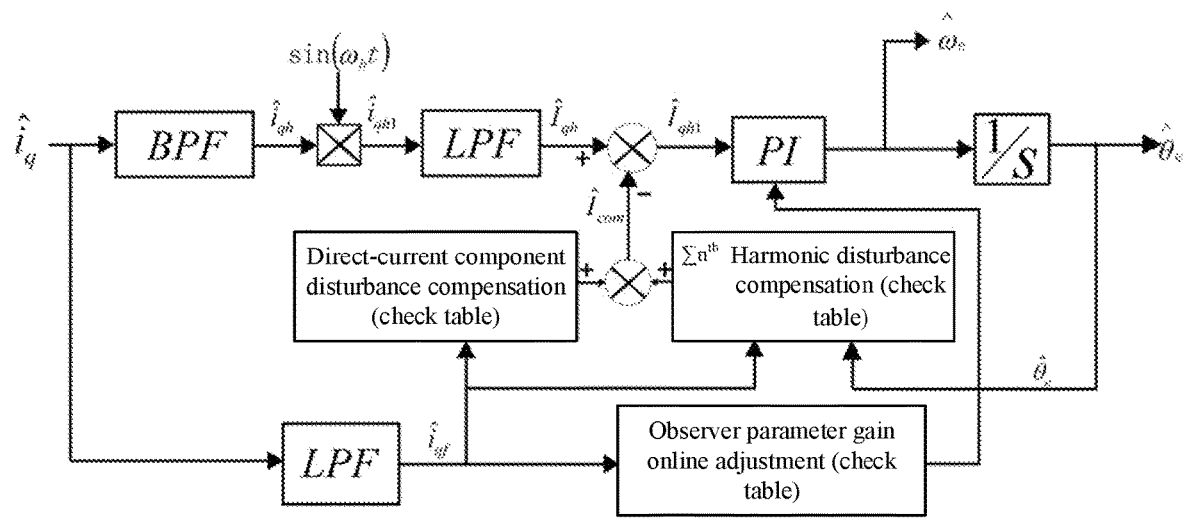
FIG. 8 is a schematic block view of error compensation in a case that a high-frequency signal is a pulse signal in a method for estimating a rotor position of a motor according to some embodiments of the present disclosure.
Figure 9:
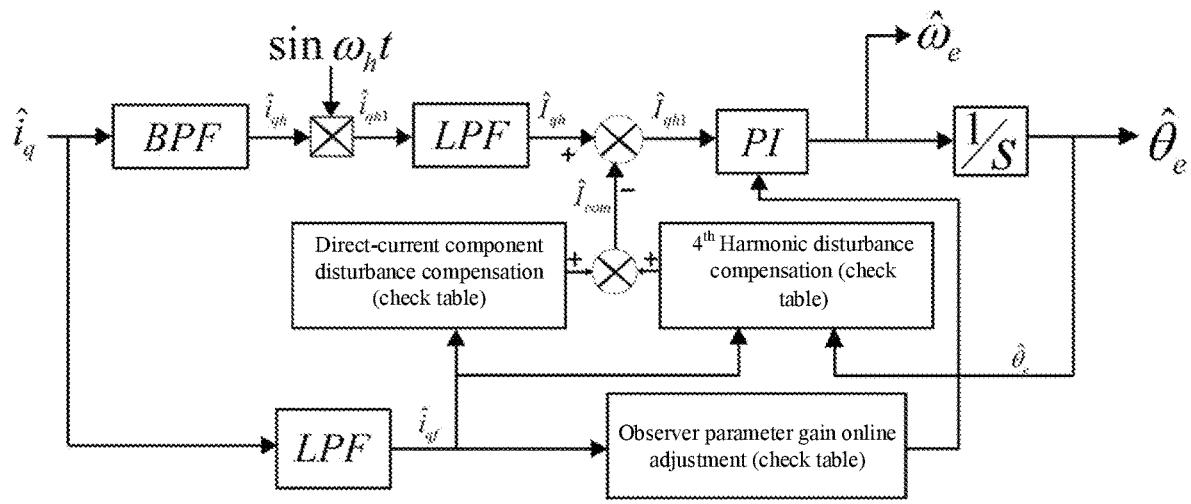
FIG. 9 is a schematic block view of error compensation in a case that a high-frequency signal is a pulse signal in a method for estimating a rotor position of a motor according to some embodiments of the present disclosure.
Figure 10:
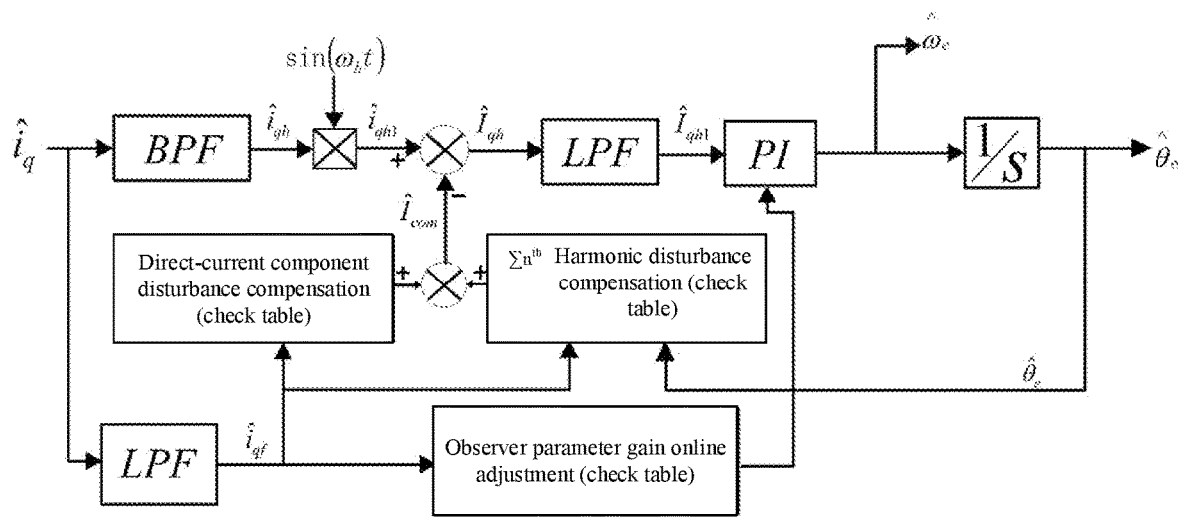
FIG. 10 is a schematic block view of error compensation in a case that a high-frequency signal is a pulse signal in a method for estimating a rotor position of a motor according to further embodiments of the present disclosure.

Therefore, the method for estimating the rotor position of the motor in the embodiment of the present disclosure comprehensively considers the influence of the above non-ideal factors, and proposes a global position estimation error compensation method. To ensure the stability of position estimation, as shown in FIGS. 8-10, a comprehensive compensation strategy of the present disclosure is proposed as followed.

a) The direct-current component disturbance compensation. Specifically, based on a direct-current component disturbance value and a load parameter (that is, a q-axis average current $\hat{i}_{qf}$ in the estimated rotor coordinate system) that are offline measured, the direct-current component disturbance value that changes with the load during the rotor position estimation process is obtained in real time. The q-axis average current $\hat{i}_{qf}$ in the estimated rotor coordinate system is obtained by filtering the total estimated q-axis current $\hat{i}_q$ through the LPF.

b) The nth harmonic component disturbance compensation. Specifically, based on a disturbance amplitude, a phase and a load parameter (that is, a q-axis average current $\hat{i}_{qf}$ in the estimated rotor coordinate system) generated by all nth harmonics measured offline, the harmonic component disturbance value that changes with the load during the rotor position estimation process is obtained in real time. It can be seen from FIGS. 8-10 that the direct-current component disturbance value and the harmonic component disturbance value are superimposed to obtain the total disturbance value $I_{com}$. The total disturbance value $\hat{I}_{com}$ is inverted and superimposed on the position error signal $\hat{I}_{qh}$ to obtain a compensated position error signal $\hat{I}_{qh1}$ which is then input to the observer.

c) The online adjustment of the observer parameter gain. Specifically, based on the offline measured amplitude of the main salient pole signal that changes with the load, the parameter value of the observer is adjusted in real time online to ensure stable operation of the observer. The compensated position error signal $\hat{I}_{qh1}$ is adjusted through the adjusted observer to obtain the estimated rotor position $\hat{\theta}_e$ and the estimated rotor speed $\hat{\omega}_e$.

The three parts of the comprehensive compensation strategy in the embodiments of the present disclosure work together to ensure the convergence and stability of position observation, improving the application ability of the high-frequency injection position-sensorless algorithm under low-frequency heavy load.

In some embodiments, the first preset relationship indicating the mapping relationship between the load parameter and the direct-current component disturbance value, the second preset relationship indicating the mapping relationship between the load parameter and the harmonic component disturbance value, and the third preset relationship indicating the mapping relationship between the load parameter and the amplitude of the main salient pole signal of the motor are obtained through offline test. The specific offline test method may be divided into the following two operations. The position sensor may be applied for auxiliary test to obtain offline data.

Operation 1: Offline Test of the First Preset Relationship and the Second Preset Relationship.

Specifically, in some embodiments, when the high-frequency signal is a pulsating signal, the obtaining the first preset relationship includes: obtaining an actual d-axis through the position sensor; obtaining a high-frequency current response test signal by injecting a high-frequency signal into the actual d-axis; determining a direct-current disturbance component in the high-frequency current response test signal, and measuring a disturbance value of the direct-current disturbance component under each preset load to obtain a direct-current component disturbance value corresponding to each preset load.

Further, in some embodiments, when the high-frequency signal is a pulsating signal, the obtaining the second preset relationship includes: obtaining an actual d-axis through the position sensor; obtaining a high-frequency current response test signal by injecting a high-frequency signal into the actual d-axis; determining a harmonic disturbance component in the high-frequency current response test signal, and measuring an amplitude and a phase of each harmonic component of the harmonic disturbance component under each preset load to obtain a harmonic component disturbance value corresponding to each preset load.

It can be understood that the actual d-axis position of the motor is obtained through the position sensor, and then the high-frequency voltage signal is injected through the actual d-axis of the motor. The actual rotor position $\theta_e$ herein and the estimated rotor position $\hat{\theta}_e$ coincide, that is, $\Delta\theta=0$. Therefore, according to formula (23), the high-frequency current response test signal herein can be obtained as followed.

$$\hat{i}'_{qh} = I^*_{dc}\sin(\theta_m) + \sum_n I^*_{n-th}\sin((\pm n - 2)\theta_e + \varphi_{n-th}) \quad (24)$$

In formula (24), the first part is the direct-current disturbance component, and the second part is the harmonic disturbance component. Therefore, by measuring the direct-current component value and the amplitude and the phase of each harmonic component of the high-frequency current response test signal $\hat{i}_{qh}'$ under each preset load at this time (that is, the q-axis average current $\hat{i}_{qf}$ in the estimated rotor coordinate system), the disturbance value of the direct-current component and the harmonic component can be obtained respectively, thus obtaining the direct-current component disturbance value and harmonic component disturbance value corresponding to each preset load. The first preset relationship and the second preset relationship are then constructed based on the obtained data. Furthermore, as shown in FIGS. 8-10, during the motor rotor position estimation process, real-time online compensation is performed according to the first preset relationship and the second preset relationship.

In other embodiments, when the high-frequency signal is a pulsating signal, and the harmonic component disturbance value is a 6th harmonic component disturbance value, the obtaining the second preset relationship further includes: obtaining an actual d-axis through the position sensor; obtaining a high-frequency current response test signal by injecting a high-frequency signal into the actual d-axis; determining a harmonic disturbance component in the high-frequency current response test signal, and measuring an amplitude and a phase of a 6th harmonic disturbance component under each preset load to obtain a harmonic component disturbance value corresponding to each preset load.

It can be understood that due to the symmetrical distribution of the three-phase winding, the current harmonics generated by the multiple salient poles in the actual dq coordinate system are generally 6 times or integer multiples of 6, while the amplitudes of other harmonics are generally small, and the influence of the 6th harmonic is generally the largest, that is, the largest source of harmonic disturbance, herein n=4. According to formula (24), when n=4, the high-frequency current response test signal can be simplified as followed.

$$\hat{i}'_{qh} \approx I^*_{dc}\sin(\theta_m) + \sum_D I^*_{n-th}\sin(-4\theta_e - 2\theta_e + \varphi_{n-th}) \approx \quad (25)$$

$$I^*_{dc}\sin(\theta_m) + \sum_n I^*_{n-th}\sin(-6\theta_e + \varphi_{n-th})$$

Therefore, when the actual compensation scheme is implemented, the amplitude and phase of the 6th disturbance harmonic in the current signal can be directly measured, which can be directly used for compensation, thereby simplifying the offline measurement process.

Specifically, as shown in FIG. 9, the total disturbance value $\hat{I}_{com}$ in FIG. 8 is modified into two parts consisting of a direct current disturbance and a disturbance component of a n=4th harmonic, and then real-time online compensation is performed at the input of the observer.

Operation 2: Offline Test of the Third Preset Relationship.

In some embodiments, when the high-frequency signal is a pulsating signal, the obtaining the third preset relationship includes: through the position sensor, keeping the estimated d-axis stationary in the estimated dq coordinate system and driving, by the actual d-axis of the actual dq coordinate system, the motor to rotate synchronously to obtain a high-frequency current response test signal; and filtering the high-frequency current response test signal or performing Fourier decomposition on the high-frequency current response test signal to obtain an amplitude of the main salient pole signal corresponding to each preset load.

It can be understood that, through the position sensor, the estimated d-axis of the estimated dq coordinate system is kept stationary (which can be fixed on the α-axis, i.e. $\hat{\theta}_e=0$), and the actual d-axis of the actual dq coordinate system drives the motor to rotate synchronously, that is, $\Delta\theta=\theta_e$. In this way, the high-frequency current response test signal is obtained as followed.

$$\hat{I}''_{qh} = I^*_m \sin(2\theta_e + \theta_m) + \sum_n I^*_{n-th}\sin(\pm n\theta_e + \varphi_{n-th}) \qquad (26)$$

For multiple salient signals, n≥4, therefore the two components in the high-frequency current response test signal $\hat{I}''_{qh}$ in formula (26) are decoupled in the frequency domain. Therefore, the high-frequency current response test signal $\hat{I}''_{qh}$ may be filtered or performed with Fourier decomposition to obtain the amplitude of the main salient pole signal $I_m^*$ corresponding to each preset load, that is, data of the main salient pole signal amplitude $I_m^*$ changing with the load. The third preset relationship is then constructed based on the obtained data. Furthermore, as shown in FIGS. 8-10, during the motor rotor position estimation process, the parameters of the observer are adjusted online in real time according to the third preset relationship to ensure the convergence and stability of the observer.

As shown in FIGS. 7-10, after the position error is comprehensively compensated, the observer such as a PI controller or an integral controller is applied to observe the position and speed of the rotor. Then the position and speed are brought into the system for speed and current closed-loop control, thereby realizing the position sensorless control of the motor at low speed.

As an example, in the embodiments of the present disclosure, as shown in FIG. 10, the disturbance component may also be compensated in the previous stage of the LPF. Compared with the embodiments shown in FIG. 8, the only difference is that the disturbance component is compensated from the previous stage of the LPF. That is, the total disturbance value $\hat{I}_{com}$ obtained by superimposing the total disturbance value and the harmonic component disturbance value is inverted and superimposed on the associated signal $\hat{i}_{qh1}$ of the position error signal to obtain the position error signal $\hat{I}_{qh}$. The position error signal $\hat{I}_{qh}$ is filtered through the LPF to obtain the compensated position error signal $\hat{I}_{qh1}$ which is then input into the observer.

Embodiment 3: Taking the square wave signal as an example, the method for estimating the rotor position of the motor in the embodiments of the present disclosure will be described in detail.

Specifically, in some embodiments, in cases that the high-frequency signal is a square wave signal, the injecting the high-frequency signal into the stator winding of the motor may include: injecting the high-frequency signal into an estimated d-axis of an estimated dq coordinate system. For example, the high-frequency signal may be a high-frequency voltage signal.

The injected high-frequency voltage may be expressed as a formula followed.

$$\hat{U}_d = U(t) = \begin{cases} U & (0 < t \le T/2) \\ -U & (T/2 < t \le T) \end{cases} \qquad (27)$$

$$\hat{U}_q = 0$$

In formula (27), U is the amplitude of the injected high-frequency voltage, $\hat{u}_d$ and $\hat{u}_q$ are estimated d and q axis voltages in the dq coordinate system, respectively, and T is the period of the high-frequency injection.

Figure 11:
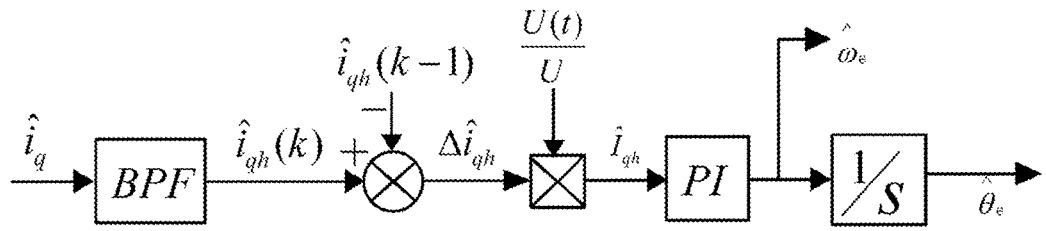
FIG. 11 is a schematic block view in which a high-frequency signal is a square wave signal in a method for estimating a rotor position of a motor according to some embodiments of the present disclosure.
Figure 12:
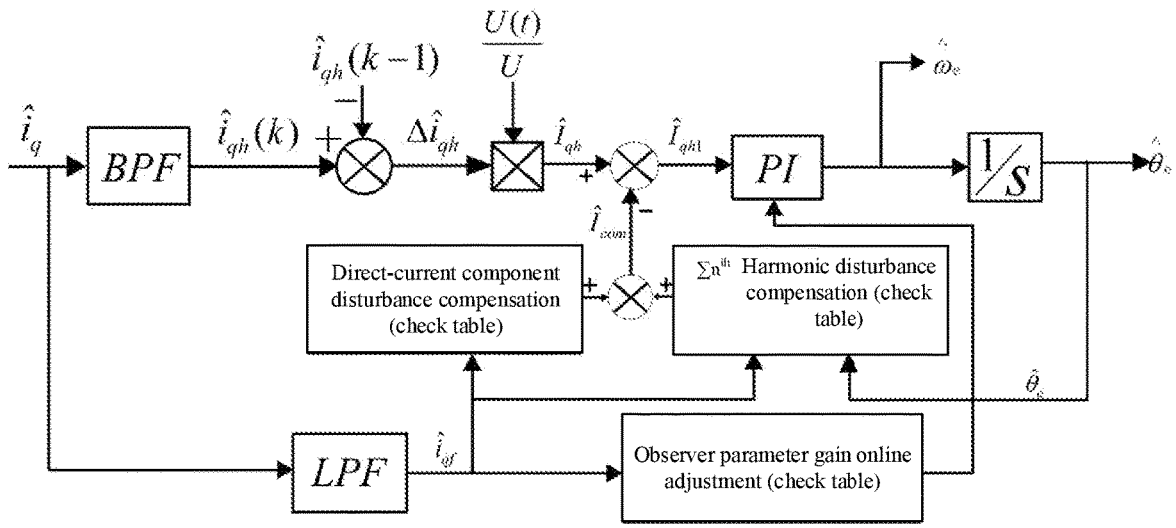
FIG. 12 is a schematic block view of error compensation in a case that a high-frequency signal is a square wave signal in a method for estimating a rotor position of a motor according to some embodiments of the present disclosure.
Figure 13:
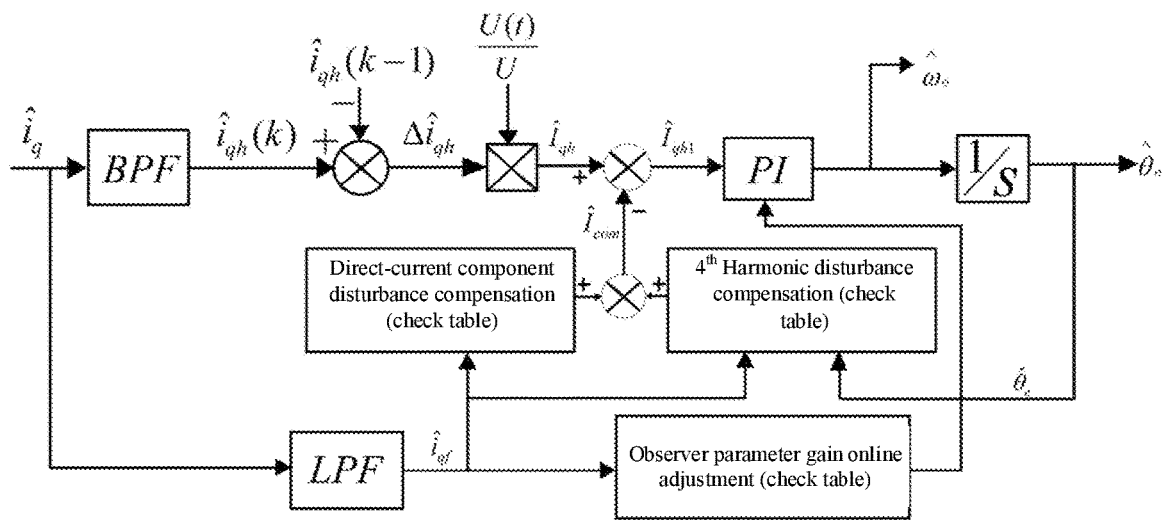
FIG. 13 is a schematic block view of error compensation in a case that a high-frequency signal is a square wave signal in a method for estimating a rotor position of a motor according to some embodiments of the present disclosure.

Further, in some embodiments, as shown in FIGS. 11-13, in cases that the high-frequency signal is a square wave signal, the obtaining the position error signal includes: collecting a total estimated q-axis current $\hat{i}_q$, and obtaining an estimated q-axis filter current $\hat{i}_{qh}(k)$ at the current sampling moment by band-pass filtering the total estimated q-axis current $\hat{i}_q$; obtaining an estimated q-axis filter current $\hat{i}_{qh}(k-1)$ at a previous sampling moment, and calculating a difference between the estimated q-axis filter current $\hat{i}_{qh}(k)$ at the current sampling moment and the estimated q-axis filter current $\hat{i}_{qh}(k-1)$ at the previous sampling moment to obtain a second deviation current $\Delta\hat{i}_{qh}$; and obtaining a position error signal $\hat{I}_{qh}$ by multiplying the second deviation current $\Delta\hat{i}_{qh}$ with a third preset signal.

The third preset signal may be the ratio of an instantaneous value U(t) of the injected high-frequency voltage to the amplitude U of the injected high-frequency voltage, i.e.

$$\frac{U(t)}{U}.$$

It can be understood that, a mathematical model of the estimated dq coordinate system of the motor may be a formula followed.

$$p\begin{bmatrix}\hat{i}_{dh}\\ \hat{i}_{qh}\end{bmatrix} = \begin{bmatrix} \Sigma L + \Delta L\cos(2\Delta\theta) & -\Delta L\sin(2\Delta\theta) \\ -\Delta L\sin(2\Delta\theta) & \Sigma L - \Delta L\cos(2\Delta\theta) \end{bmatrix}^{-1}\begin{bmatrix}\hat{U}_d\\ \hat{U}_q\end{bmatrix} \qquad (28)$$

In formula (28), $\hat{i}_{dh}$ and $\hat{i}_{qh}$ represent the high-frequency current signals of the d-axis and q-axis in the estimated dq coordinate system, respectively. $\Delta\theta$ is a position error, that is, an error between an actual rotor position $\theta_e$ and an estimated rotor position $\theta_e$·p is a differential operator. $\Sigma L$ and $\Delta L$ satisfy relationships as followed.

$$\Sigma L = \frac{L_{dh} + L_{qh}}{2} \qquad (29)$$

$$\Delta L = \frac{L_{dh} - L_{qh}}{2}$$

In formula (29), $L_{dh}$ and $L_{qh}$ represent high-frequency incremental inductances of the d-axis and q-axis in the dq coordinate system, respectively. The differential value of the estimated q-axis high-frequency current signal $\hat{i}_{qh}$ in the estimated dq coordinate system, i.e., the second deviation current $\Delta\hat{i}_{qh}$ can be obtained by bringing formula (27) into formula (28) as followed.

$$\Delta\hat{i}_{qh} = \begin{cases} \dfrac{\sin(2\Delta\theta)(L_{qh} - L_{dh})}{2L_{dh}L_{qh}}TU & (0 < t \le T/2) \\ -\dfrac{\sin(2\Delta\theta)(L_{qh} - L_{dh})}{2L_{dh}L_{qh}}TU & (T/2 < t \le T) \end{cases} \qquad (30)$$

According to the polarity of the injected high-frequency voltage in formula (27), further signal processing is performed on the second deviation current $\Delta\hat{i}_{qh}$, that is, the second deviation current $\Delta\hat{i}_{qh}$ is multiplied by the third preset signal to obtain the position error signal $\hat{I}_{qh}$.

$$\hat{I}_{qh} = \Delta \hat{i}_{qh} \cdot \frac{U(t)}{U} = \frac{\sin(2\Delta\theta)(L_{qh} - L_{dh})}{2L_{dh}L_{qh}} TU \quad (31)$$

It can be seen from formula (31) that for a motor with a salient pole effect, that is, $(L_{dh}-L_{qh})$ is not equal to zero, when the position error $\Delta\theta$ is zero, the position error signal $\hat{I}_{qh}$ is also zero. Therefore, the position error signal $\hat{I}_{qh}$ can be directly controlled, that is, the position error signal $\hat{I}_{qh}$ can be controlled to zero in real time, such that the estimated rotor position $\hat{\theta}_e$ can track the actual rotor position $\theta_e$ in real time, that is, the position error $\Delta\theta$ is zero. To achieve the above control of the position error signal $\hat{I}_{qh}$, the position error signal $\hat{I}_{qh}$ is configured as an input signal of the observer to obtain the estimated rotor position $\hat{\theta}_e$ and the estimated rotor speed $\hat{\omega}_e$.

Further, the formula (31) may be expressed as the following form.

$$\hat{I}_{qh} = \Delta \hat{i}_{qh} \cdot \frac{U(t)}{U} = \frac{\sin(2\Delta\theta)(L_{qh} - L_{dh})}{2L_{dh}L_{qh}} TU = I_m \sin(2\Delta\theta) \quad (32)$$

$I_m$ is the amplitude of the position error signal $\hat{I}_{qh}$.

However, when the motor is loaded, the motor saliency effect changes significantly due to non-linear factors such as iron core saturation, resulting in the actual current response signal in formula (32) as followed.

$$\hat{I}_{qh} = I_m^* \sin(2\Delta\theta + \theta_m) + \sum_n I_{n-th}^* \sin(\pm n\theta_e - 2\hat{\theta}_e + \varphi_{n-th}) \quad (33)$$

The formula (33) may be further transformed as followed.

$$\hat{I}_{qh} \approx I_m^* \sin(2\Delta\theta) + I_{dc}^* \sin(\theta_m) + \sum_n I_{n-th}^* \sin(\pm n\theta_e - 2\hat{\theta}_e + \varphi_{n-th}) \quad (34)$$

In formula (34), n is a harmonic order of multiple salient poles, $I^*_{n-th}$ and $\varphi_{n-th}$ are the amplitude and phase of the high-frequency current generated by a n-th salient pole harmonic, respectively, $I^*_m$ represents the amplitude of a main harmonic signal, $I^*_{dc}$ represents the amplitude of the disturbance signal of the direct-current component. ±depends on the rotation direction of the multiple salient harmonics, and $\theta_m$ represents the phase shift of the main salient signal. It can be found from formula (34) that, affected by the non-ideal motor salient pole effect (including the main salient pole and the multiple salient poles), the current response signal obtained from actual processing has changed significantly compared to formula (32), which can be summarized in three aspects as follows.

a) The amplitude of the main harmonic signal $I^*_m$ changes with the load.

b) The direct-current component disturbance signal $I^*_{dc} \sin(\theta_m)$. The appearance of this part of the disturbance component is the result of the phase shift of the main salient signal, and changes with the load.

c) The disturbance signal generated by the n-th salient pole harmonic, that is, the third term ($\sum_n I^*_{n-th} \sin(\pm n\theta_e - 2\hat{\theta}_e + \varphi_{n-th})$ in formula (34), is caused by the multiple salient poles, and the amplitude and phase change with the load.

Therefore, the method for estimating the rotor position of the motor in the embodiment of the present disclosure comprehensively considers the influence of the above non-ideal factors, and proposes a global position estimation error compensation method. To ensure the stability of position estimation, as shown in FIGS. 12-13, a comprehensive compensation strategy of the present disclosure is proposed as followed.

a) The direct-current component disturbance compensation. Specifically, based on a direct-current component disturbance value and a load parameter (that is, a q-axis average current $\hat{i}_{qf}$ in the estimated rotor coordinate system) that are offline measured, the direct-current component disturbance value that changes with the load during the rotor position estimation process is obtained in real time. The q-axis average current $\hat{i}_{qf}$ in the estimated rotor coordinate system is obtained by filtering the total estimated q-axis current $\hat{i}_q$ through the LPF.

b) The nth harmonic component disturbance compensation. Specifically, based on a disturbance amplitude, a phase and a load parameter (that is, a q-axis average current $\hat{i}_{qf}$ in the estimated rotor coordinate system) generated by all nth harmonics measured offline, the harmonic component disturbance value that changes with the load during the rotor position estimation process is obtained in real time. It can be seen from FIGS. 12-13 that the direct-current component disturbance value and the harmonic component disturbance value are superimposed to obtain the total disturbance value $\hat{I}_{com}$. The total disturbance value $\hat{I}_{com}$ is inverted and superimposed on the position error signal $\hat{I}_{qh}$ to obtain a compensated position error signal $\hat{I}_{qh1}$ which is then input to the observer.

c) The online adjustment of the observer parameter gain. Specifically, based on the offline measured amplitude of the main salient pole signal that changes with the load, the parameter value of the observer is adjusted in real time online to ensure stable operation of the observer. The compensated position error signal $\hat{I}_{qh1}$ is adjusted through the adjusted observer to obtain the estimated rotor position $\hat{\theta}_e$ and the estimated rotor speed $\hat{\omega}_e$.

The three parts of the comprehensive compensation strategy in the embodiments of the present disclosure work together to ensure the convergence and stability of position observation, improving the application ability of the high-frequency injection position-sensorless algorithm under low-frequency heavy load.

In some embodiments, the first preset relationship indicating the mapping relationship between the load parameter and the direct-current component disturbance value, the second preset relationship indicating the mapping relationship between the load parameter and the harmonic component disturbance value, and the third preset relationship indicating the mapping relationship between the load parameter and the amplitude of the main salient pole signal of the motor are obtained through offline test. The specific offline test method may be divided into the following two operations. The position sensor may be applied for auxiliary test to obtain offline data.

Operation 1: Offline Test of the First Preset Relationship and the Second Preset Relationship.

Specifically, in some embodiments, when the high-frequency signal is a square wave signal, the obtaining the first preset relationship includes: obtaining an actual d-axis through the position sensor; obtaining a high-frequency current response test signal by injecting a high-frequency signal into the actual d-axis; determining a direct-current disturbance component in the high-frequency current response test signal, and measuring a disturbance value of the direct-current disturbance component under each preset load to obtain a direct-current component disturbance value corresponding to each preset load.

Further, in some embodiments, when the high-frequency signal is a square wave signal, the obtaining the second preset relationship includes: obtaining an actual d-axis through the position sensor; obtaining a high-frequency current response test signal by injecting a high-frequency signal into the actual d-axis; determining a harmonic disturbance component in the high-frequency current response test signal, and measuring an amplitude and a phase of each harmonic component of the harmonic disturbance component under each preset load to obtain a harmonic component disturbance value corresponding to each preset load.

It can be understood that the actual d-axis position of the motor is obtained through the position sensor, and then the high-frequency voltage signal is injected through the actual d-axis of the motor. The actual rotor position $\theta_e$ herein and the estimated rotor position $\hat{\theta}_e$ coincide, that is, $\Delta\theta=0$. Therefore, according to formula (34), the high-frequency current response test signal herein can be obtained as followed.

$$\hat{i}'_{qh} = I^*_{dc}\sin(\theta_m) + \sum_n I^*_{n-th}\sin((\pm n - 2)\theta_e + \varphi_{n-th}) \quad (35)$$

In formula (35), the first part is the direct-current disturbance component, and the second part is the harmonic disturbance component. Therefore, by measuring the direct-current component value and the amplitude and the phase of each harmonic component of the high-frequency current response test signal $\hat{I}_{qh}'$ under each load at this time (that is, the q-axis average current $\hat{i}_{qf}$ in the estimated rotor coordinate system), the disturbance value of the direct-current component and the harmonic component can be obtained respectively, thus obtaining the direct-current component disturbance value and harmonic component disturbance value corresponding to each preset load. The first preset relationship and the second preset relationship are then constructed based on the obtained data. Furthermore, as shown in FIGS. 12-13, during the motor rotor position estimation process, real-time online compensation is performed according to the first preset relationship and the second preset relationship.

In other embodiments, when the high-frequency signal is a square wave signal, and the harmonic component disturbance value is a 6th harmonic component disturbance value, the obtaining the second preset relationship further includes: obtaining an actual d-axis through the position sensor; obtaining a high-frequency current response test signal by injecting a high-frequency signal into the actual d-axis; determining a harmonic disturbance component in the high-frequency current response test signal, and measuring an amplitude and a phase of a 6th harmonic disturbance component under each preset load to obtain a harmonic component disturbance value corresponding to each preset load.

It can be understood that due to the symmetrical distribution of the three-phase winding, the current harmonics generated by the multiple salient poles in the actual dq coordinate system are generally 6 times or integer multiples of 6, while the amplitudes of other harmonics are generally small, and the influence of the 6th harmonic is generally the largest, that is, the largest source of harmonic disturbance, herein n=4. According to formula (35), when n=4, the high-frequency current response test signal can be simplified as followed.

$$\hat{i}'_{qh} \approx I^*_{dc}\sin(\theta_m) + \sum_n I^*_{n-th}\sin(-4\theta_e - 2\theta_e + \varphi_{n-th}) \approx \quad (36)$$

$$I^*_{dc}\sin(\theta_m) + \sum_n I^*_{n-th}\sin(-6\theta_e + \varphi_{n-th})$$

Therefore, when the actual compensation scheme is implemented, the amplitude and phase of the 6th disturbance harmonic in the current signal can be directly measured, which can be directly used for compensation, thereby simplifying the offline measurement process.

Specifically, as shown in FIG. 13, the total disturbance value $\hat{I}_{com}$ in FIG. 12 is modified into two parts consisting of a direct current disturbance and a disturbance component of a n=4th harmonic, and then real-time online compensation is performed at the input of the observer.

Operation 2: Offline Test of the Third Preset Relationship.

In some embodiments, when the high-frequency signal is a square wave signal, the obtaining the third preset relationship includes: through the position sensor, keeping the estimated d-axis stationary in the estimated dq coordinate system and driving, by the actual d-axis of the actual dq coordinate system, the motor to rotate synchronously to obtain a high-frequency current response test signal; and filtering the high-frequency current response test signal or performing Fourier decomposition on the high-frequency current response test signal to obtain an amplitude of the main salient pole signal corresponding to each preset load.

It can be understood that, through the position sensor, the estimated d-axis of the estimated dq coordinate system is kept stationary (which can be fixed on the $\alpha$-axis, i.e. $\hat{\theta}_e=0$), and the actual d-axis of the actual dq coordinate system drives the motor to rotate synchronously, that is, $\Delta\theta=\theta_e$. In this way, the high-frequency current response test signal is obtained as followed.

$$\hat{i}''_{qh} = I^*_m\sin(2\theta_e + \theta_m) + \sum_n I^*_{n-th}\sin(\pm n\theta_e + \varphi_{n-th}) \quad (37)$$

For multiple salient signals, n≥4, therefore the two components in the high-frequency current response test signal $\hat{I}_{qh}''$ in formula (37) are decoupled in the frequency domain. Therefore, the high-frequency current response test signal $\hat{I}_{qh}''$ may be filtered or performed with Fourier decomposition to obtain the amplitude of the main salient pole signal $I_m^*$ corresponding to each preset load, that is, data of the main salient pole signal amplitude $I_m^*$ changing with the load. The third preset relationship is then constructed based on the obtained data. Furthermore, as shown in FIGS. 12-13, during the motor rotor position estimation process, the parameters of the observer are adjusted online in real time according to the third preset relationship to ensure the convergence and stability of the observer.

As shown in FIGS. 12-13, after the position error is comprehensively compensated, the observer such as a PI controller or an integral controller is applied to observe the position and speed of the rotor. Then the position and speed are brought into the system for speed and current closed-loop control, thereby realizing the position sensorless control of the motor at low speed.

Embodiment 4: Taking the rotating high-frequency signal as an example, the method for estimating the rotor position of the motor in the embodiments of the present disclosure will be described in detail.

Specifically, in some embodiments, in cases that the high-frequency signal is a rotating high-frequency signal, the injecting the high-frequency signal into the stator winding of the motor may include: injecting a first high-frequency signal into α-axis of a stationary coordinate system and a second high-frequency into β-axis of the stationary coordinate system. For example, the high-frequency signal may be a high-frequency voltage signal.

The injected high-frequency voltage may be expressed as a formula followed.

$$\begin{cases} U_\alpha = U \cos\omega_h t \\ U_\beta = U \sin\omega_h t \end{cases} \quad (38)$$

In formula (38), U is the amplitude of the injected high-frequency voltage, $\omega_h$ is the frequency of the high-frequency injection, and $u_\alpha$ and $u_\beta$ represent the α-axis and β-axis voltages in the stationary coordinate system, respectively.

Figure 14:
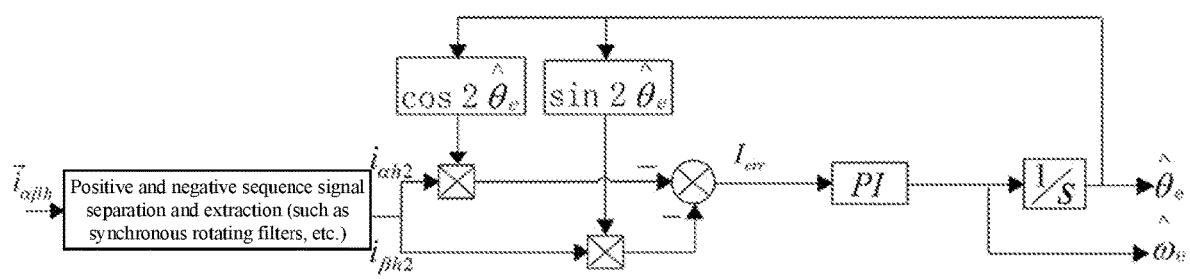
FIG. 14 is a schematic block view in which a high-frequency signal is a rotating high-frequency signal in a method for estimating a rotor position of a motor according to some embodiments of the present disclosure.
Figure 15:
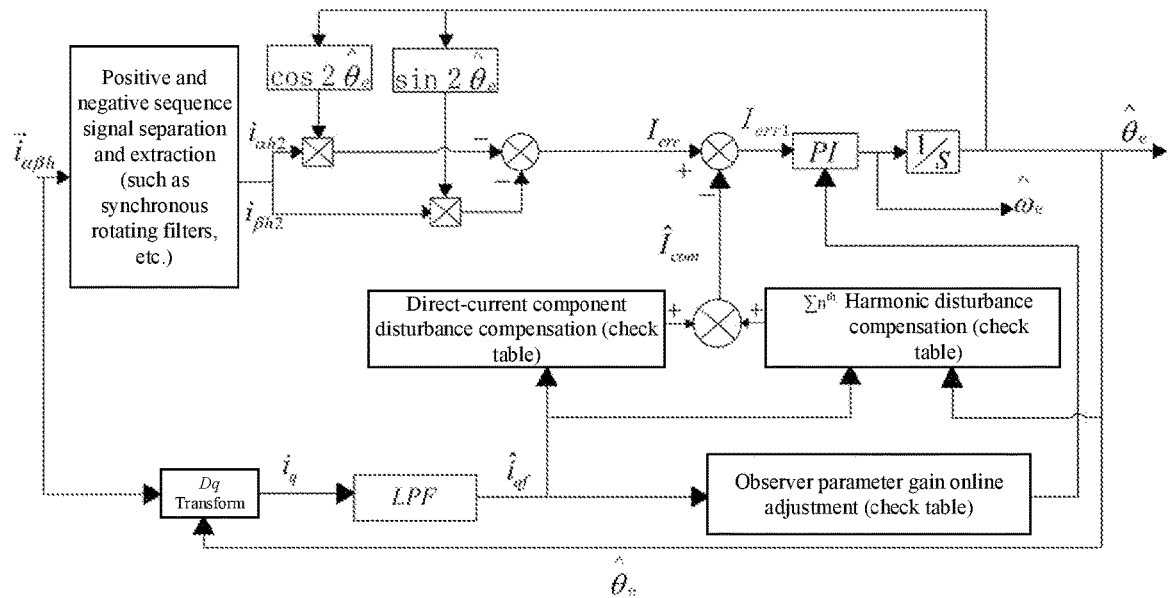
FIG. 15 is a schematic block view of error compensation in a case that a high-frequency signal is a rotating high-frequency signal in a method for estimating a rotor position of a motor according to some embodiments of the present disclosure.
Figure 16:
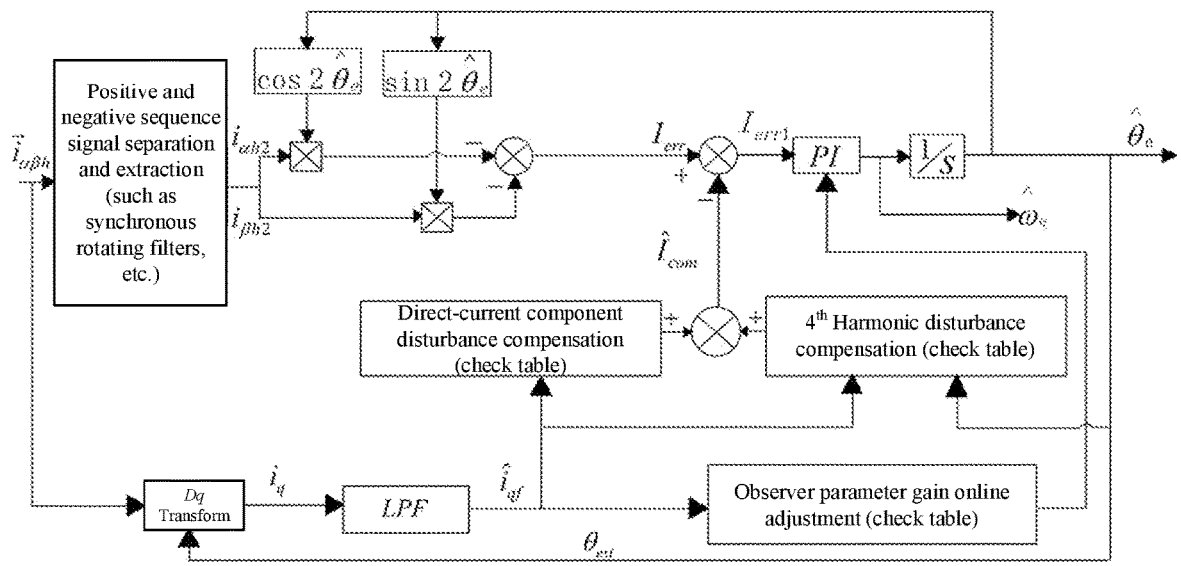
FIG. 16 is a schematic block view of error compensation in a case that a high-frequency signal is a rotating high-frequency signal in a method for estimating a rotor position of a motor according to some embodiments of the present disclosure.

Further, in some embodiments, as shown in FIGS. 14-16, in cases that the high-frequency signal is a rotating high-frequency signal, the obtaining the position error signal includes: obtaining a high-frequency current $\vec{i}_{\alpha\beta h}$ in the stationary coordinate system, and separating and extracting positive and negative sequence signals from the high-frequency current $\vec{i}_{\alpha\beta h}$ in the stationary coordinate system to obtain rotor position information at low frequency, wherein the rotor position information at low frequency includes α-axis low-frequency current $i_{\alpha h2}$ and β-axis low-frequency current $i_{\beta h2}$; and heterodyne processing the α-axis low-frequency current $i_{\alpha h2}$ and β-axis low-frequency current $i_{\beta h2}$ to obtain the position error signal $I_{err}$.

It can be understood that considering the simplicity of the motor mathematical model on the actual dq coordinate system, in order to facilitate the solution of the high-frequency current response signal, the high-frequency voltage coordinate of the stationary coordinate system in formula (38) can be transformed to the actual dq coordinate system as followed.

$$\begin{bmatrix} U_d \\ U_q \end{bmatrix} = U \begin{bmatrix} \cos((\omega_h - \omega_e)t) \\ \sin((\omega_h - \omega_e)t) \end{bmatrix} \quad (39)$$

In formula (39), $U_d$ and $U_q$ respectively represent the high-frequency voltage of the d-axis and q-axis in the actual dq coordinate system, and $\omega_e$ is the electrical angular frequency of the rotor. Under high frequency excitation, neglecting the winding resistance, the actual dq coordinate system voltage formula can be simplified as followed.

$$\begin{bmatrix} \frac{di_{dh}}{dt} \\ \frac{di_{qh}}{dt} \end{bmatrix} = \begin{bmatrix} L_d & 0 \\ 0 & L_q \end{bmatrix}^{-1} \begin{bmatrix} U_d \\ U_q \end{bmatrix} \quad (40)$$

In formula (40), $i_{dh}$ and $i_{qh}$ are respectively expressed as the d-axis and q-axis high-frequency currents in the actual dq coordinate system. Therefore, formulas (39) and (40) can be solved to obtain the high-frequency rotating current in the actual dq coordinate system.

$$\vec{i}_{dqh} = $$
$$i_{dh} + ji_{qh} = -j\frac{|U|}{\omega_h L_d L_q}\left[\frac{1}{2}(L_d + L_q)e^{j(\omega_h - \omega_e)t} + \frac{1}{2}(-L_d + L_q)e^{-j(\omega_h - \omega_e)t}\right]$$

(41)

Then formula (41) is transformed to the stationary coordinate system, thereby obtaining the high-frequency current $\vec{i}_{\alpha\beta h}$ in the stationary coordinate system.

$$\vec{i}_{\alpha\beta h} = \vec{i}_{dqh}e^{j\omega_e t} = $$
$$i_{\alpha h} + ji_{\beta h} = \frac{|U|}{\omega_h L_d L_q}\left[\frac{1}{2}(L_d + L_q)e^{j(\omega_h t - \frac{\pi}{2})} + \frac{1}{2}(-L_d + L_q)e^{-j(\omega_h t - 2\theta_e - \frac{\pi}{2})}\right]$$

(42)

From formula (42), it can be seen that the negative sequence component of the high-frequency current $\vec{i}_{\alpha\beta h}$ in the stationary coordinate system contains the rotor position information. Therefore, the high-frequency current $\vec{i}_{\alpha\beta h}$ can be processed by separating the positive sequence component $$\frac{|U|}{\omega_h L_d L_q}\frac{1}{2}(L_d + L_q)e^{j(\omega_h t - \frac{\pi}{2})}$$

and the negative sequence component $$\frac{1}{2}(-L_d + L_q)e^{-j(\omega_h t - 2\theta_e - \frac{\pi}{2})}$$

in formula (42) to obtain the rotor position information in the negative sequence component. The positive and negative sequence signal separation and position information extraction methods can be with such as synchronous rotation filters to obtain the rotor position information at low frequency including the α-axis low-frequency current $i_{\alpha h2}$ and β-axis low-frequency current $i_{\beta h2}$.

$$i_{\alpha h2} + ji_{\beta h2} = \frac{1}{2}\frac{|U|}{\omega_h L_d L_q}(-L_d + L_q)e^{j(2\theta_e + \frac{\pi}{2})} \quad (43)$$

As shown in FIG. 14-17, the α-axis low-frequency current $i_{\alpha h2}$ and β-axis low-frequency current $i_{\beta h2}$ are heterodyneed to obtain the position error signal $I_{err}$.

$$I_{err} = \quad (44)$$
$$-i_{\alpha h2} \cdot \cos(2\theta_{est}) - i_{\beta h2} \cdot \sin(2\theta_{est}) = \frac{1}{2}\frac{|U|}{\omega_h L_d L_q}(-L_d + L_q)\sin(2\Delta\theta)$$

Further, formula (44) can be expressed as the following form.

$$I_{err} = \frac{1}{2}\frac{|U|}{\omega_h L_d L_q}(-L_d + L_q)\sin(2\Delta\theta) = I_m \sin(2\Delta\theta) \quad (45)$$

$I_m$ is the amplitude of the position error signal $I_{err}$.

Further, as shown in FIGS. 14-16, the position error signal $I_{err}$ can be input into the observer to obtain the estimated rotor position $\hat{\theta}_e$ and the estimated rotor speed $\hat{\omega}_e$.

However, when the motor is loaded, the motor saliency effect changes significantly due to non-linear factors such as iron core saturation, resulting in the actual current response signal in formula (45) as followed.

$$I_{err} = I_m^* \sin(2\Delta\theta + \theta_m) + \sum_n I_{n-th}^* \sin(\pm n\theta_e - 2\hat{\theta}_e + \varphi_{n-th}) \quad (46)$$

The formula (46) may be further transformed as followed.

$$I_{err} \approx I_m^* \sin(2\Delta\theta) + I_{dc}^* \sin(\theta_m) + \sum_n I_{n-th}^* \sin(\pm n\theta_e - 2\hat{\theta}_e + \varphi_{n-th}) \quad (47)$$

In formula (47), n is a harmonic order of multiple salient poles, $I^*_{n-th}$ and $\varphi_{n-th}$ are the amplitude and phase of the high-frequency current generated by a n-th salient pole harmonic, respectively, $I^*_m$ represents the amplitude of a main harmonic signal, $I^*_{dc}$ represents the amplitude of the disturbance signal of the direct-current component. ±depends on the rotation direction of the multiple salient harmonics, and $\theta_m$ represents the phase shift of the main salient signal. It can be found from formula (47) that, affected by the non-ideal motor salient pole effect (including the main salient pole and the multiple salient poles), the current response signal obtained from actual processing has changed significantly compared to formula (45), which can be summarized in three aspects as follows.

a) The amplitude of the main harmonic signal $I^*_m$ changes with the load.

b) The direct-current component disturbance signal $I^*_{dc} \sin(\theta_m)$. The appearance of this part of the disturbance component is the result of the phase shift of the main salient signal, and changes with the load.

c) The disturbance signal generated by the n-th salient pole harmonic, that is, the third term ($\Sigma_n I^*_{n-th} \sin(\pm n\theta_e - 2\hat{\theta}_e + \varphi_{n-th})$) in formula (47), is caused by the multiple salient poles, and the amplitude and phase change with the load.

Therefore, the method for estimating the rotor position of the motor in the embodiment of the present disclosure comprehensively considers the influence of the above non-ideal factors, and proposes a global position estimation error compensation method. To ensure the stability of position estimation, as shown in FIGS. 15-16, a comprehensive compensation strategy of the present disclosure is proposed as followed.

a) The direct-current component disturbance compensation. Specifically, based on a direct-current component disturbance value and a load parameter (that is, a q-axis average current $\hat{i}_{qf}$ in the estimated rotor coordinate system) that are offline measured, the direct-current component disturbance value that changes with the load during the rotor position estimation process is obtained in real time. The q-axis average current $\hat{i}_{qf}$ in the estimated rotor coordinate system is obtained by coordinate transforming the current $\vec{i}_{\alpha\beta h}$ in the stationary coordinate system to the estimated dq coordinate system and filtering through the LPF.

b) The nth harmonic component disturbance compensation. Specifically, based on a disturbance amplitude, a phase and a load parameter (that is, a q-axis average current $\hat{i}_{qf}$ in the estimated rotor coordinate system) generated by all nth harmonics measured offline, the harmonic component disturbance value that changes with the load during the rotor position estimation process is obtained in real time. It can be seen from FIGS. 15-16 that the direct-current component disturbance value and the harmonic component disturbance value are superimposed to obtain the total disturbance value $\hat{I}_{com}$. The total disturbance value $\hat{I}_{com}$ is inverted and superimposed on the position error signal $I_{err}$ to obtain a compensated position error signal $I_{err1}$ which is then input to the observer.

c) The online adjustment of the observer parameter gain. Specifically, based on the offline measured amplitude of the main salient pole signal that changes with the load, the parameter value of the observer is adjusted in real time online to ensure stable operation of the observer. The compensated position error signal $I_{err1}$ is adjusted through the adjusted observer to obtain the estimated rotor position $\hat{\theta}_e$ and the estimated rotor speed $\hat{\omega}_e$.

The three parts of the comprehensive compensation strategy in the embodiments of the present disclosure work together to ensure the convergence and stability of position observation, improving the application ability of the high-frequency injection position-sensorless algorithm under low-frequency heavy load.

In some embodiments, the first preset relationship indicating the mapping relationship between the load parameter and the direct-current component disturbance value, the second preset relationship indicating the mapping relationship between the load parameter and the harmonic component disturbance value, and the third preset relationship indicating the mapping relationship between the load parameter and the amplitude of the main salient pole signal of the motor are obtained through offline test. The specific offline test method may be divided into the following two operations. The position sensor may be applied for auxiliary test to obtain offline data.

Operation 1: Offline Test of the Third Preset Relationship.

Specifically, in some embodiments, when the high-frequency signal is a rotating high-frequency signal, the obtaining the third preset relationship includes: in a stationary coordinate system, obtaining a high-frequency current $\vec{i}_{\alpha\beta h}$ in the stationary coordinate system by injecting a rotating high-frequency signal into a stator winding of a motor; obtaining rotor position information at low frequency by processing the high-frequency current $\vec{i}_{\alpha\beta h}$ in the stationary coordinate system, wherein the rotor position information at low frequency includes α-axis low-frequency current $i_{\alpha h2}$ and β-axis low-frequency current $i_{\beta h2}$; measuring data of a main salient pole signal amplitude $I_m^*$ of the α-axis low-frequency current $i_{\alpha h2}$ or the β-axis low-frequency current $i_{\beta h2}$ changing with a load to obtain the main salient pole signal amplitude corresponding to each load.

It can be understood that in the stationary coordinate system, after injecting the rotating high-frequency voltage shown in formula (38) into the stator winding of the motor, the high-frequency current $\vec{i}_{\alpha\beta h}$ in the stationary coordinate system is obtained, and the positive and negative sequence signals are separated and extracted from the high-frequency current $\vec{i}_{\alpha\beta h}$ in the stationary coordinate system to obtain the rotor position information at low frequency, wherein the rotor position information at low frequency includes the α-axis low-frequency current $i_{\alpha h2}$ and β-axis low-frequency current $i_{\beta h2}$; and the data of the main salient pole signal amplitude $I_m^*$ of the α-axis low-frequency current $i_{\alpha h2}$ and/or the β-axis low-frequency current $i_{\beta h2}$ changing with a load is measure, and the third preset relationship is constructed based on the obtained data. Furthermore, as shown in FIGS. 15-16, during the motor rotor position estimation process, the parameters of the observer are adjusted online in real time according to the third preset relationship to ensure the convergence and stability of the observer.

Operation 2: Offline Test of the First Preset Relationship and the Second Preset Relationship.

Specifically, in some embodiments, when the high-frequency signal is a rotating high-frequency signal, the obtaining the first preset relationship includes: obtaining an actual rotor position of the motor through a position sensor, and obtaining a high-frequency current response test signal according to the actual rotor position; determining a direct-current disturbance component in the high-frequency current response test signal, and measuring the disturbance value of the direct-current disturbance component under each preset load to obtain a direct-current component disturbance value corresponding to each preset load.

Further, in some embodiments, when the high-frequency signal is a rotating high-frequency signal, the obtaining the second preset relationship includes: obtaining an actual rotor position of the motor through a position sensor, and obtaining a high-frequency current response test signal according to the actual rotor position; determining a harmonic disturbance component in the high-frequency current response test signal, and measuring an amplitude and a phase of each harmonic component of the harmonic disturbance component under each preset load to obtain the harmonic component disturbance value corresponding to each preset load.

Figure 17:
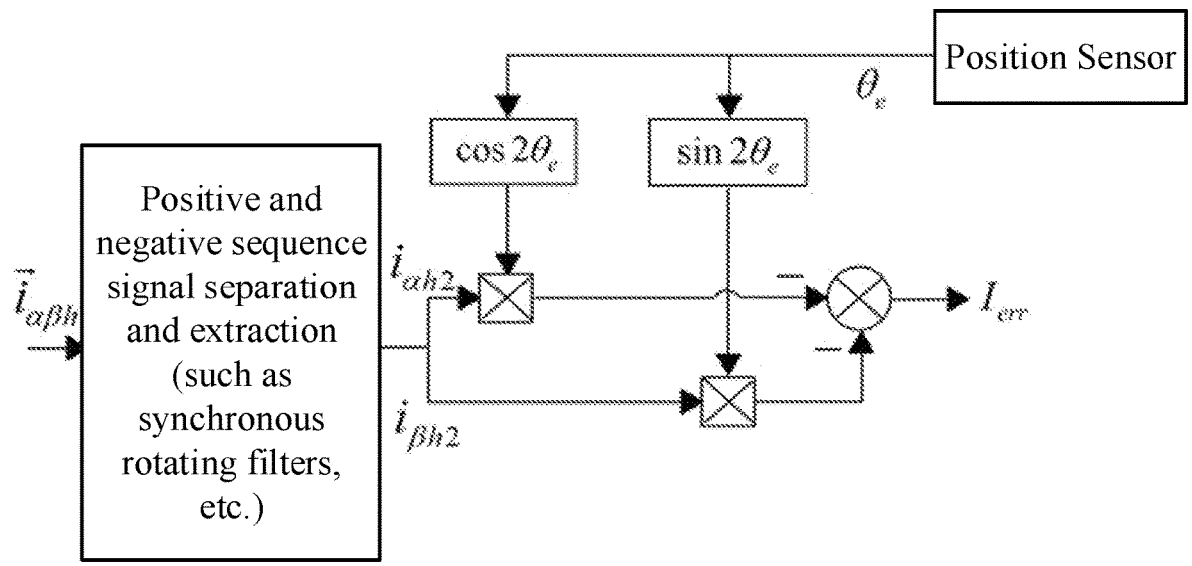
FIG. 17 is a schematic block view of error compensation in a case that a high-frequency signal is a rotating high-frequency signal in a method for estimating a rotor position of a motor according to further embodiments of the present disclosure.

It can be understood that the actual rotor position of the motor is obtained through the position sensor, and then the high-frequency rotating voltage signal is injected through the actual rotor position of the motor. The actual rotor position $\theta_e$ herein and the estimated rotor position $\hat{\theta}_e$ coincide, that is, $\Delta\theta=0$. When the current signal is heterodyne processed, the actual rotor position of the motor is used for feedback, as shown in FIG. 17, the high-frequency current response test signal herein can be obtained as followed.

$$I'_{err} = I_{dc}^* \sin(\theta_m) + \sum_n I_{n-th}^* \sin((\pm n - 2)\theta_e + \varphi_{n-th}) \qquad (48)$$

In formula (48), the first part is the direct-current disturbance component, and the second part is the harmonic disturbance component. Therefore, by measuring the direct-current component value and the amplitude and the phase of each harmonic component of the high-frequency current response test signal $I_{err}'$ under each load at this time (that is, the q-axis average current $\hat{i}_{qf}$ in the estimated rotor coordinate system), the disturbance value of the direct-current component and the harmonic component can be obtained respectively, thus obtaining the direct-current component disturbance value and harmonic component disturbance value corresponding to each preset load. The first preset relationship and the second preset relationship are then constructed based on the obtained data. Furthermore, as shown in FIGS. 15-16, during the motor rotor position estimation process, real-time online compensation is performed according to the first preset relationship and the second preset relationship.

In other embodiments, when the high-frequency signal is a rotating high-frequency signal, and the harmonic component disturbance value is a 6th harmonic component disturbance value, the obtaining the second preset relationship further includes: obtaining an actual rotor position of the motor through the position sensor; obtaining a high-frequency current response test signal according to the actual rotor position; determining a harmonic disturbance component in the high-frequency current response test signal, and measuring an amplitude and a phase of a 6th harmonic disturbance component under each preset load to obtain a harmonic component disturbance value corresponding to each preset load.

It can be understood that due to the symmetrical distribution of the three-phase winding, the current harmonics generated by the multiple salient poles in the actual dq coordinate system are generally 6 times or integer multiples of 6, while the amplitudes of other harmonics are generally small, and the influence of the 6th harmonic is generally the largest, that is, the largest source of harmonic disturbance, herein n=4. According to formula (48), when n=4, the high-frequency current response test signal can be simplified as followed.

$$I'_{err} \approx I_{dc}^* \sin(\theta_m) + \sum_n I_{n-th}^* \sin(-4\theta_e - 2\theta_e + \varphi_{n-th}) \approx \qquad (49)$$

$$I_{dc}^* \sin(\theta_m) + \sum_n I_{n-th}^* \sin(-6\theta_e + \varphi_{n-th})$$

Therefore, the actual compensation scheme can be implemented to directly measure the amplitude and phase of the 6th disturbance harmonics in the current signal, which can be used directly for compensation, thereby simplifying the offline measurement process.

Specifically, as shown in FIG. 16, the total disturbance value $\hat{I}_{com}$ in FIG. 15 is modified into two parts consisting of a direct current disturbance and a disturbance component of a n=4th harmonic, and then real-time online compensation is performed at the input of the observer.

As shown in FIGS. 15-16, after the position error is comprehensively compensated, the observer such as a PI controller or an integral controller is applied to observe the position and speed of the rotor. Then the position and speed are brought into the system for speed and current closed-loop control, thereby realizing the position sensorless control of the motor at low speed.

It should be noted that the method for estimating the rotor position of the motor in the embodiments of the present disclosure is not limited to being applied to permanent magnet synchronous motors, but can also be extended and applied to synchronous reluctance motors, stator permanent magnet switched flux linkage motors, and other synchronous motors with similar mathematical models.

In summary, according to the method for estimating a rotor position of a motor proposed in the embodiments of the present disclosure, a position error signal is obtained by injecting a high-frequency signal into a stator winding of the motor, and a load parameter indicating the load of the motor is obtained; according to the load parameter and a first preset relationship, a direct-current component disturbance value is obtained; according to the load parameter and a second preset relationship, a harmonic component disturbance value is obtained; according to the load parameter and a third preset relationship, an observer parameter value is obtained; the position error signal is compensated according to the direct-current component disturbance value and the harmonic component disturbance value to obtain a compensated position error signal; a parameter of the observer is adjusted according to the observer parameter value; and the compensated position error signal is adjusted through the adjusted observer to obtain the rotor position and a rotor speed. Therefore, the method for estimating the rotor position of the motor in the embodiments of the present disclosure can solve the position estimation accuracy and reliability problems caused by the salient pole effect of the motor when the load changes significantly, improve stability of the high-frequency injection sensorless algorithm in low speed and heavy load occasions, and make the application range of the high-frequency injection sensorless algorithm larger.

Figure 18:
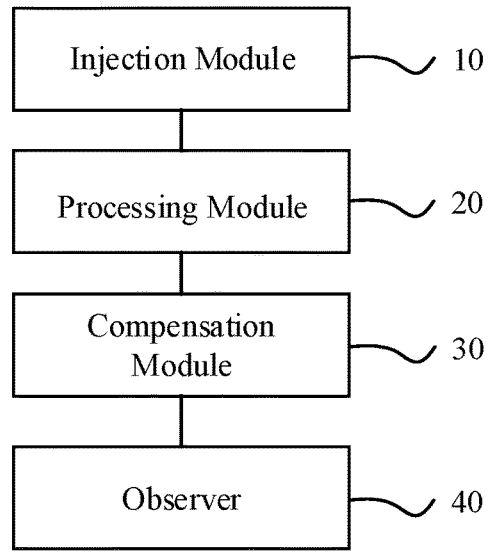
FIG. 18 is a schematic block view of an apparatus for estimating a rotor position of a motor according to some embodiments of the present disclosure.

Corresponding to the method for estimating the rotor position of the motor in the foregoing embodiments, some embodiments of the present disclosure also propose an apparatus for estimating a rotor position of a motor. FIG. 18 is a schematic block view of an apparatus for estimating a rotor position of a motor according to some embodiments of the present disclosure. As shown in FIG. 18, the apparatus for estimating the rotor position of the motor includes: an injection module 10, a processing module 20, a compensation module 30 and an observer 40.

The injection module 10 is configured to inject a high-frequency signal into a stator winding of the motor; the processing module 20 is configured to obtain a position error signal; the compensation module 30 is configured to obtain a load parameter indicating the load of the motor, obtain a direct-current component disturbance value according to the load parameter and a first preset relationship, obtain a harmonic component disturbance value according to the load parameter and a second preset relationship, obtain an observer parameter value according to the load parameter and a third preset relationship, and compensate the position error signal according to the direct-current component disturbance value and the harmonic component disturbance value to obtain a compensated position error signal; the observer 40 is configured to adjust a parameter of the observer according to the observer parameter value, and adjust the compensated position error signal through the adjusted observer to obtain the rotor position and a rotor speed.

It should be noted that the foregoing explanation of the embodiments of the method for estimating the rotor position of the motor is also applicable to the apparatus for estimating the rotor position of the motor in this embodiment, and will not be repeated here.

In summary, according to the apparatus for estimating the rotor position of the motor proposed in the embodiment of the present disclosure, through an injection module, a high-frequency signal is injected into a stator winding of the motor; through a processing module, a position error signal is obtained; through a compensation module, a load parameter indicating the load of the motor is obtained, a direct-current component disturbance value is obtained according to the load parameter and a first preset relationship, a harmonic component disturbance value is obtained according to the load parameter and a second preset relationship, an observer parameter value is obtained according to the load parameter and a third preset relationship, and the position error signal is compensated according to the direct-current component disturbance value and the harmonic component disturbance value to obtain a compensated position error signal; through an observer, a parameter of the observer is adjusted according to the observer parameter value, and the compensated position error signal is adjusted through the adjusted observer to obtain the rotor position and a rotor speed. Therefore, the apparatus for estimating the rotor position of the motor in the embodiment of the present disclosure can solve the position estimation accuracy and reliability problems caused by the salient pole effect of the motor when the load changes significantly, improve stability of the high-frequency injection sensorless algorithm in low speed and heavy load occasions, and make the application range of the high-frequency injection sensorless algorithm larger.

Based on the apparatus for estimating the rotor position of the motor in the foregoing embodiment, some embodiments of the present disclosure also propose a motor control system, including the apparatus for estimating the rotor position of the motor in the embodiment of the second aspect of the present disclosure.

The motor control system proposed by the embodiment of the present disclosure, by virtue of the arranged apparatus for estimating the rotor position of the motor, can solve the position estimation accuracy and reliability problems caused by the salient pole effect of the motor when the load changes significantly, improve stability of the high-frequency injection sensorless algorithm in low speed and heavy load occasions, and make the application range of the high-frequency injection sensorless algorithm larger.

Based on the method for estimating the rotor position of the motor in the above embodiments, some embodiments of the present disclosure also proposes an apparatus for estimating a rotor position of a motor, including a memory, a processor, and a program for estimating the rotor position of the motor stored in the memory and runnable on the processor. When the processor executes the program, the aforementioned method for estimating the rotor position of the motor is realized.

The apparatus for estimating the rotor position of the motor proposed in the embodiment of the present disclosure, when the program for estimating the rotor position of the motor stored in the memory and runnable on the processor is executed by the processor, can solve the position estimation accuracy and reliability problems caused by the salient pole effect of the motor when the load changes significantly, improve stability of the high-frequency injection sensorless algorithm in low speed and heavy load occasions, and make the application range of the high-frequency injection sensorless algorithm larger.

Based on the apparatus for estimating the rotor position of the motor in the foregoing embodiment, an embodiment of the present disclosure also propose a motor control system, including the apparatus for estimating the rotor position of the motor in the embodiment of the fourth aspect of the present disclosure.

The motor control system proposed by the embodiment of the present disclosure, by virtue of the arranged apparatus for estimating the rotor position of the motor, can solve the position estimation accuracy and reliability problems caused by the salient pole effect of the motor when the load changes significantly, improve stability of the high-frequency injection sensorless algorithm in low speed and heavy load occasions, and make the application range of the high-frequency injection sensorless algorithm larger.

In the description of this specification, descriptions with reference to the terms "an embodiment", "some embodiments", "an example", "specific examples", or "some examples" etc. mean that specific features, structures, materials, or characteristics described in connection with the embodiment or examples are included in at least one embodiment or example of the present disclosure. In this specification, the schematic representation of the above terms does not have to be directed to the same embodiment or example. Moreover, the specific features, structures, materials, or characteristics described may be combined in a suitable manner in any one or more embodiments or examples. In addition, without contradicting each other, those skilled in the art may combine different embodiments or examples described in this specification and the features of the different embodiments or examples.

In addition, the terms "first" and "second" are only for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, "a plurality of" means at least two, such as two, three, etc., unless specifically defined otherwise.

Any process or method description in the flowchart or described in other ways herein can be understood as a module, fragment, or portion of code including one or more executable instructions for implementing steps of a customized logical function or process. The scope of the preferred embodiments of the present disclosure include additional implementations in which the functions may be performed not in the order shown or discussed, including according to the functions involved in a substantially simultaneous manner or in a reverse order, as should be understood by those skilled in the art to which the embodiments of the present disclosure belong.

The logic and/or steps represented in a flowchart or otherwise described herein, for example, may be considered a sequential list of executable instructions for implementing a logical function that may be specifically implemented in any computer-readable medium for use by or in conjunction with an instruction execution system, device, or apparatus (e.g., a computer-based system, a system including a processor, or other systems that can take and execute instructions from the instruction execution system, device, or apparatus). For purposes of this specification, a "computer readable medium" may be any device that can include, store, communicate, disseminate, or transmit a program for use by or in conjunction with an instruction-executing system, device, or apparatus. More specific examples of computer-readable media (a non-exhaustive list) include the following: electrically connected sections with one or more wiring (electronic devices), portable computer disk cartridges (magnetic devices), random access memory (RAM), read-only memory (ROM), erasable editable read-only memory (EPROM or flash memory), fiber optic devices, and portable compact disc read-only memory (CDROM). Alternatively, the computer readable medium may even be paper or other suitable medium on which the program can be printed, since the program can be obtained electronically, for example, by optical scanning of the paper or other medium, followed by editing, decoding or, if necessary, processing in other suitable ways, and then storing it in the computer memory.

It should be understood that each part of the present disclosure can be implemented by hardware, software, firmware or a combination thereof. In the above embodiments, multiple steps or methods can be implemented by software or firmware stored in a memory and executed by a suitable instruction execution system. For example, if implemented by hardware as in some embodiments, the steps or methods can be implemented by any one or a combination of the following technologies known in the art: discrete logic circuits with logic gates for implementing logic functions on data signals, specialized integrated circuits with suitable combinational logic gates, programmable gate arrays (PGAs), field programmable gate arrays (FPGAs), etc.

Those skilled in the art can understand that that all or some of the steps carried out to implement the method of the above embodiments can be accomplished by instructing the relevant hardware by means of a program. The program can be stored in a computer readable storage medium which and be executed to perform operations including one of the steps of the method embodiments or a combination thereof.

In addition, each functional unit in each embodiment of the present disclosure may be integrated in a processing module, or the individual units may physically exist separately, or two or more units may be integrated in a single module. The integrated modules can be implemented either in the form of hardware or in the form of software functional modules. The integrated module may also be stored in a computer readable storage medium if it is implemented in the form of a software function module and sold or used as a standalone product.

The above mentioned storage media may be read-only memory, disk or CD-ROM, etc. Although embodiments of the present disclosure have been shown and described above, it is understood that the above embodiments are exemplary and are not to be construed as limiting the present disclosure n, and that variations, modifications, replacements and variants of the above embodiments may be made by those skilled in the art within the scope of the present disclosure.

What is claimed is:

1. A method for estimating a rotor position of a motor, comprising:
    obtaining a position error signal by injecting a high-frequency signal into a stator winding of the motor;
    obtaining a load parameter indicating a load of the motor, obtaining a direct-current component disturbance value according to the load parameter and a first preset relationship, obtaining a harmonic component disturbance value according to the load parameter and a second preset relationship, and obtaining an observer parameter value according to the load parameter and a third preset relationship;
    compensating the position error signal or an associated signal of the position error signal according to the direct-current component disturbance value and the harmonic component disturbance value to obtain a compensated position error signal; and
    adjusting an observer parameter according to the observer parameter value in real time online to an adjusted observer parameter value based on an offline measured signal, and adjusting the compensated position error signal through the adjusted observer parameter value to obtain the rotor position and a rotor speed.

2. The method according to claim 1, wherein the compensating the position error signal or the associated signal of the position error signal according to the direct-current component disturbance value and the harmonic component disturbance value comprises:
    obtaining a total disturbance value by superimposing the direct-current component disturbance value with the harmonic component disturbance value; and obtaining the compensated position error signal by inverting the total disturbance value and superimposing the inverted total disturbance value on the position error signal or on the associated signal of the position error signal.

3. The method according to claim 1, wherein in accordance with a determination that the high-frequency signal is a 45-degree axis demodulated pulse signal, a pulsating signal, or a square wave signal, the injecting the high-frequency signal into the stator winding of the motor comprises:
   injecting the high-frequency signal into an estimated d-axis of an estimated dq coordinate system;
   in accordance with a determination that the high-frequency signal is a rotating high-frequency signal, the injecting the high-frequency signal into the stator winding of the motor comprises:
   injecting a first high-frequency signal into an α-axis of a stationary coordinate system and a second high-frequency into a β-axis of the stationary coordinate system.

4. The method according to claim 1, wherein the load parameter is a q-axis average current in an estimated rotor coordinate system.

5. The method according to claim 1, wherein an offline test is performed to obtain the first preset relationship, the second preset relationship, and the third preset relationship; the first preset relationship is configured to indicate a mapping relationship between the load parameter and the direct-current component disturbance value; the second preset relationship is configured to indicate a mapping relationship between the load parameter and the harmonic component disturbance value; the third preset relationship is configured to indicate a mapping relationship between the load parameter and an amplitude of a main salient pole signal of the motor; the amplitude of the main salient pole signal is inversely proportional to the observer parameter value.

6. The method according to claim 5, wherein in accordance with a determination that the high-frequency signal is a 45-degree axis demodulated pulse signal, a pulsating signal, or a square wave signal, obtaining the first preset relationship comprises:
   obtaining an actual d-axis through a position sensor;
   obtaining a high-frequency current response test signal by injecting the high-frequency signal into the actual d-axis; and
   obtaining the direct-current component disturbance value corresponding to each preset load by determining a direct-current disturbance component in the high-frequency current response test signal and measuring a disturbance value of the direct-current disturbance component under each preset load.

7. The method according to claim 5, wherein in accordance with a determination that the high-frequency signal is a 45-degree axis demodulated pulse signal, a pulsating signal, or a square wave signal, obtaining the second preset relationship comprises:
   obtaining an actual d-axis through a position sensor;
   obtaining a high-frequency current response test signal by injecting the high-frequency signal into the actual d-axis; and
   obtaining the harmonic component disturbance value corresponding to each preset load by determining a harmonic disturbance component in the high-frequency current response test signal and measuring an amplitude and a phase of each harmonic component of the harmonic disturbance component under each preset load.

8. The method according to claim 5, wherein in accordance with a determination that the high-frequency signal is a 45-degree axis demodulated pulse signal, a pulsating signal, or a square wave signal, and the harmonic component disturbance value is a 6th harmonic component disturbance value, obtaining the second preset relationship comprises:
   obtaining an actual d-axis through a position sensor;
   obtaining a high-frequency current response test signal by injecting the high-frequency signal into the actual d-axis; and
   obtaining the harmonic component disturbance value corresponding to each preset load by determining a harmonic disturbance component in the high-frequency current response test signal and measuring an amplitude and a phase of a 6th harmonic disturbance component under each preset load.

9. The method according to claim 5, wherein in accordance with a determination that the high-frequency signal is a 45-degree axis demodulated pulse signal, a pulsating signal, or a square wave signal, and the harmonic component disturbance value is a 6th harmonic component disturbance value, obtaining the third preset relationship comprises:
   through a position sensor, keeping an estimated d-axis stationary in an estimated dq coordinate system; and driving, by an actual d-axis of an actual dq coordinate system, the motor to rotate synchronously to obtain a high-frequency current response test signal; and
   obtaining the amplitude of the main salient pole signal corresponding to each preset load by filtering the high-frequency current response test signal or performing Fourier decomposition on the high-frequency current response test signal.

10. The method according to claim 5, wherein in accordance with a determination that the high-frequency signal is a rotating high-frequency signal, obtaining the third preset relationship comprises:
    in a stationary coordinate system, obtaining a high-frequency current in the stationary coordinate system by injecting the rotating high-frequency signal into a stator winding of the motor;
    obtaining rotor position information at low frequency by processing the high-frequency current in the stationary coordinate system, wherein the rotor position information at low frequency comprises an α-axis low-frequency current and a β-axis low-frequency current; and
    obtaining the amplitude of the main salient pole signal corresponding to each load by measuring the amplitudes of the main salient pole signal of the α-axis low-frequency current or the β-axis low-frequency current under different loads.

11. The method according to claim 5, wherein in accordance with a determination that the high-frequency signal is a rotating high-frequency signal, obtaining the first preset relationship comprises:
    obtaining an actual rotor position of the motor through a position sensor, and obtaining a high-frequency current response test signal according to the actual rotor position; and
    obtaining the direct-current component disturbance value corresponding to each preset load by determining a direct-current disturbance component in the high-frequency current response test signal and measuring a disturbance value of the direct-current disturbance component under each preset load.

12. The method according to claim 5, wherein in accordance with a determination that the high-frequency signal is a rotating high-frequency signal, obtaining the second preset relationship comprises:
obtaining an actual rotor position of the motor through a position sensor, and obtaining a high-frequency current response test signal according to the actual rotor position; and
obtaining the harmonic component disturbance value corresponding to each preset load by determining a harmonic disturbance component in the high-frequency current response test signal and measuring an amplitude and a phase of each harmonic component of the harmonic disturbance component under each preset load.

13. The method according to claim 5, wherein in accordance with a determination that the high-frequency signal is a rotating high-frequency signal, and the harmonic component disturbance value is a 6th harmonic component disturbance value, obtaining the second preset relationship comprises:
obtaining an actual rotor position of the motor through a position sensor, and obtaining a high-frequency current response test signal according to the actual rotor position; and
obtaining the harmonic component disturbance value corresponding to each preset load by determining a harmonic disturbance component in the high-frequency current response test signal and measuring an amplitude and a phase of a 6th harmonic disturbance component under each preset load.

14. The method according to claim 1, wherein in accordance with a determination that the high-frequency signal is a 45-degree axis demodulated pulse signal, obtaining the position error signal comprises:
collecting a current of a stator winding, and obtaining a d-axis current and a q-axis current in a 45-degree estimated dq coordinate system by performing a coordinate transformation on the current of the stator winding;
obtaining a first deviation current by calculating a difference between the d-axis current and the q-axis current in the 45-degree estimated dq coordinate system, and obtaining a filtered first deviation current by band-pass filtering the first deviation current; and
obtaining a first current response signal by multiplying the filtered first deviation current with a first preset signal, and obtaining a second current response signal by low-pass filtering the first current response signal; wherein the first preset signal is determined according to the high-frequency signal, and the second current response signal is a direct-current portion of the first current response signal;
wherein the first current response signal is the associated signal of the position error signal, and the second current response signal is the position error signal.

15. The method according to claim 1, wherein in accordance with a determination that the high-frequency signal is a pulsating signal, obtaining the position error signal comprises:
obtaining a total estimated q-axis current, and obtaining a filtered estimated q-axis current by band-pass filtering the total estimated q-axis current; and
obtaining a third current response signal by multiplying the filtered estimated q-axis current with a second preset signal, and obtaining a fourth current response signal by low-pass filtering the third current response signal; wherein the second preset signal is determined according to the high-frequency signal, and the fourth current response signal is a direct-current portion of the third current response signal;
the third current response signal is the associated signal of the position error signal, and the fourth current response signal is the position error signal.

16. The method according to claim 1, wherein in accordance with a determination that the high-frequency signal is a square wave signal, obtaining the position error signal comprises:
collecting a total estimated q-axis current, and obtaining an estimated q-axis filter current at a current sampling moment by band-pass filtering the total estimated q-axis current;
obtaining an estimated q-axis filter current at a previous sampling moment, and calculating a difference between the estimated q-axis filter current at the current sampling moment and the estimated q-axis filter current at the previous sampling moment to obtain a second deviation current; and
obtaining the position error signal by multiplying the second deviation current with a third preset signal.

17. The method according to claim 1, wherein in accordance with a determination that the high-frequency signal is a rotating high-frequency signal, obtaining the position error signal comprises:
obtaining a high-frequency current in a stationary coordinate system, and obtaining rotor position information at low frequency by separating and extracting positive and negative sequence signals from the high-frequency current in the stationary coordinate system, wherein the rotor position information at low frequency comprises an α-axis low-frequency current and a β-axis low-frequency current; and
obtaining the position error signal by heterodyne processing the α-axis low-frequency current and the β-axis low-frequency current.

18. An apparatus for estimating a rotor position of a motor, comprising a memory, a processor, and a program for estimating the rotor position of the motor stored in the memory and runnable on the processor; wherein the processor executes the program to perform:
obtaining a position error signal by injecting a high-frequency signal into a stator winding of the motor;
obtaining a load parameter indicating a load of the motor, obtaining a direct-current component disturbance value according to the load parameter and a first preset relationship, obtaining a harmonic component disturbance value according to the load parameter and a second preset relationship, and obtaining an observer parameter value according to the load parameter and a third preset relationship;
compensating the position error signal or an associated signal of the position error signal according to the direct-current component disturbance value and the harmonic component disturbance value to obtain a compensated position error signal; and
adjusting an observer parameter according to the observer parameter value in real time online to an adjusted observer parameter value based on an offline measured signal, and adjusting the compensated position error signal through the adjusted observer parameter value to obtain the rotor position and a rotor speed.

19. A motor control system, comprising an apparatus for estimating a rotor position of a motor, the apparatus comprising a memory, a processor, and a program for estimating the rotor position of the motor stored in the memory and runnable on the processor; wherein the processor executes the program to perform:

obtaining a position error signal by injecting a high-frequency signal into a stator winding of the motor;

obtaining a load parameter indicating a load of the motor, obtaining a direct-current component disturbance value according to the load parameter and a first preset relationship, obtaining a harmonic component disturbance value according to the load parameter and a second preset relationship, and obtaining an observer parameter value according to the load parameter and a third preset relationship;

compensating the position error signal or an associated signal of the position error signal according to the direct-current component disturbance value and the harmonic component disturbance value to obtain a compensated position error signal; and adjusting an observer parameter according to the observer parameter value in real time online to an adjusted observer parameter value based on an offline measured signal, and adjusting the compensated position error signal through the adjusted observer parameter value to obtain the rotor position and a rotor speed.

20. The motor control system according to claim 19, wherein the compensating the position error signal or the associated signal of the position error signal according to the direct-current component disturbance value and the harmonic component disturbance value comprises:

obtaining a total disturbance value by superimposing the direct-current component disturbance value with the harmonic component disturbance value; and obtaining the compensated position error signal by inverting the total disturbance value and superimposing the inverted total disturbance value on the position error signal or on the associated signal of the position error signal.

* * * * *